(12) United States Patent
Osterhoff

(10) Patent No.: US 10,351,030 B2
(45) Date of Patent: Jul. 16, 2019

(54) SEAT TRIM RETENTION SYSTEM WITH ASYMMETRICAL RETENTION FORCE

(71) Applicant: Ford Global Technologies, LLC, Dearborn, MI (US)

(72) Inventor: Daniel Jay Osterhoff, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 24 days.

(21) Appl. No.: 15/704,390

(22) Filed: Sep. 14, 2017

(65) Prior Publication Data

US 2019/0077287 A1   Mar. 14, 2019

(51) Int. Cl.
| | | |
|---|---|---|
| *B60N 2/64* | (2006.01) | |
| *B60N 2/68* | (2006.01) | |
| *B60N 2/58* | (2006.01) | |
| *B60N 2/72* | (2006.01) | |
| *B60N 2/90* | (2018.01) | |

(52) U.S. Cl.
CPC ............ *B60N 2/5825* (2013.01); *B60N 2/72* (2013.01); *B60N 2/90* (2018.02)

(58) Field of Classification Search
CPC .. B60N 2/5825; B60N 2/2862; B60N 2/0232; B60N 2/2868; B60N 2/0284; B60N 2/986; B60R 21/207; B60R 2011/0017; B60R 11/0235; A47C 31/023
See application file for complete search history.

(56) References Cited

U.S. PATENT DOCUMENTS

| | | | | |
|---|---|---|---|---|
| 3,018,133 | A * | 1/1962 | Mills | B60N 2/882 297/397 |
| 3,669,492 | A * | 6/1972 | Peterson | B60N 2/2821 297/253 |
| 3,792,897 | A * | 2/1974 | Alson | A61G 5/10 297/219.1 |
| 3,841,703 | A * | 10/1974 | Lowe | B61D 33/0042 297/440.2 |
| 4,086,679 | A | 5/1978 | Butler | |
| 4,403,895 | A | 9/1983 | Caldwell et al. | |
| 4,406,033 | A | 9/1983 | Chisholm et al. | |
| 4,425,690 | A | 1/1984 | Fraser et al. | |
| 4,440,443 | A * | 4/1984 | Nordskog | A47C 7/38 297/397 |

(Continued)

FOREIGN PATENT DOCUMENTS

WO   2004089690 A1   10/2004

*Primary Examiner* — Shin H Kim
(74) *Attorney, Agent, or Firm* — Vichit Chea; Price Heneveld LLP

(57) ABSTRACT

A vehicle comprises: a first seating assembly including a seat, a seatback, and a midline defining an outboard direction directed away from the midline, and an inboard direction directed toward the midline; the seatback comprising a trim carrier interconnected with a closeout panel through a snap-fit connection; wherein, the snap-fit connection resists disconnection of the trim carrier from the closeout panel when a force is applied to the trim carrier from the outboard direction of the snap-fit connection to a greater degree than when a force is applied to the trim carrier from the inboard direction of the snap-fit connection. A grommet attached to the trim carrier can provide the snap-fit connection between the trim carrier and the closeout panel.

20 Claims, 29 Drawing Sheets

(56) References Cited

U.S. PATENT DOCUMENTS

| | | | |
|---|---|---|---|
| 4,467,987 A | 8/1984 | Small | |
| 4,481,240 A | 11/1984 | Roth | |
| 4,583,255 A * | 4/1986 | Mogaki | A61H 9/0078 |
| | | | 5/419 |
| 4,588,628 A | 5/1986 | Roth | |
| 4,720,146 A * | 1/1988 | Mawbey | B60N 2/914 |
| | | | 297/409 |
| 4,822,092 A * | 4/1989 | Sweers | B60N 2/015 |
| | | | 24/662 |
| 4,861,104 A * | 8/1989 | Malak | B60N 2/5825 |
| | | | 297/218.3 |
| 5,050,930 A * | 9/1991 | Schuster | A43D 3/1433 |
| | | | 297/284.4 |
| 5,323,740 A * | 6/1994 | Daily | F01M 13/0416 |
| | | | 123/143 C |
| 5,443,303 A * | 8/1995 | Bauer | B60N 2/85 |
| | | | 297/408 |
| 5,458,365 A * | 10/1995 | Rogers | B60R 21/215 |
| | | | 280/728.3 |
| 5,518,294 A * | 5/1996 | Ligon, Sr. | B60N 2/6673 |
| | | | 297/284.4 |
| 5,609,394 A * | 3/1997 | Ligon, Sr. | B60N 2/6671 |
| | | | 297/284.1 |
| 5,662,384 A * | 9/1997 | O'Neill | A47C 4/54 |
| | | | 297/284.6 |
| 5,738,368 A * | 4/1998 | Hammond | B60N 2/68 |
| | | | 280/730.1 |
| 5,775,778 A * | 7/1998 | Riley | A47C 4/02 |
| | | | 297/218.5 |
| 5,785,669 A * | 7/1998 | Proctor | A47C 7/425 |
| | | | 297/284.6 |
| 5,826,312 A * | 10/1998 | Schroder | B60N 2/5825 |
| | | | 24/601.2 |
| 5,951,039 A * | 9/1999 | Severinski | B60R 21/207 |
| | | | 280/728.2 |
| 5,983,940 A * | 11/1999 | Smith | F16K 5/0442 |
| | | | 137/625.22 |
| 6,019,387 A * | 2/2000 | Jost | B60R 21/207 |
| | | | 280/730.2 |
| 6,079,781 A * | 6/2000 | Tilley | B60H 1/00285 |
| | | | 297/180.1 |
| 6,106,071 A * | 8/2000 | Aebischer | B60N 2/686 |
| | | | 297/452.18 |
| 6,158,812 A * | 12/2000 | Bonke | B60R 16/08 |
| | | | 297/391 |
| 6,161,231 A * | 12/2000 | Kraft | A47C 17/22 |
| | | | 5/12.1 |
| 6,199,951 B1 * | 3/2001 | Zeile | B60N 2/3011 |
| | | | 297/15 |
| 6,217,062 B1 * | 4/2001 | Breyvogel | B60N 2/68 |
| | | | 280/728.2 |
| 6,296,308 B1 * | 10/2001 | Cosentino | A47C 7/465 |
| | | | 297/284.4 |
| 6,352,304 B1 * | 3/2002 | Sorgenfrei | B60R 21/207 |
| | | | 280/730.2 |
| 6,357,066 B1 * | 3/2002 | Pierce | A61B 6/0442 |
| | | | 5/710 |
| 6,382,720 B1 * | 5/2002 | Franklin | B60N 2/6027 |
| | | | 297/221 |
| 6,394,546 B1 * | 5/2002 | Knoblock | A47C 1/023 |
| | | | 297/284.4 |
| 6,550,856 B1 * | 4/2003 | Ganser | B60N 2/20 |
| | | | 297/61 |
| 6,568,754 B1 * | 5/2003 | Norton | B60R 21/207 |
| | | | 297/216.12 |
| 6,588,838 B1 * | 7/2003 | Dick, Jr. | B60N 2/5825 |
| | | | 297/216.13 |
| 6,671,934 B2 * | 1/2004 | Wenzlick | F16B 5/0614 |
| | | | 24/289 |
| 6,715,185 B2 * | 4/2004 | Angellotti | F16B 5/065 |
| | | | 24/297 |
| 6,758,522 B2 * | 7/2004 | Ligon, Sr. | A47C 7/46 |
| | | | 297/284.1 |
| 6,820,640 B2 * | 11/2004 | Hand | A61G 7/05776 |
| | | | 137/487.5 |
| 6,890,030 B2 * | 5/2005 | Wilkerson | A47C 1/023 |
| | | | 297/284.11 |
| 6,908,151 B2 * | 6/2005 | Meeker | B60N 2/2806 |
| | | | 297/250.1 |
| 6,912,748 B2 * | 7/2005 | VanSickle | A47C 4/54 |
| | | | 5/654 |
| 6,991,289 B2 * | 1/2006 | House | A47C 7/72 |
| | | | 297/217.4 |
| 7,131,694 B1 * | 11/2006 | Buffa | B60N 2/6671 |
| | | | 297/284.4 |
| 7,213,883 B2 * | 5/2007 | Charnitski | B60N 2/885 |
| | | | 297/391 |
| 7,267,363 B2 * | 9/2007 | Tredez | B60R 21/207 |
| | | | 280/728.3 |
| 7,425,034 B2 * | 9/2008 | Bajic | B60N 2/5635 |
| | | | 297/180.12 |
| 7,478,869 B2 * | 1/2009 | Lazanja | B60N 2/5635 |
| | | | 297/180.13 |
| 7,481,489 B2 * | 1/2009 | Derrick | B60N 2/5825 |
| | | | 297/218.1 |
| 7,506,938 B2 * | 3/2009 | Brennan | A47C 7/74 |
| | | | 297/180.13 |
| 7,578,554 B2 * | 8/2009 | Lee | B60N 2/62 |
| | | | 297/284.11 |
| 7,726,733 B2 * | 6/2010 | Balser | B60N 2/4235 |
| | | | 280/730.2 |
| 7,753,451 B2 * | 7/2010 | Maebert | B60N 2/686 |
| | | | 297/344.11 |
| 7,823,971 B2 * | 11/2010 | Hunner | B60N 2/4228 |
| | | | 297/216.12 |
| 7,850,247 B2 * | 12/2010 | Stauske | B60N 2/5621 |
| | | | 297/452.24 |
| 7,871,129 B2 * | 1/2011 | Boes | B60N 2/815 |
| | | | 297/404 |
| 8,126,615 B2 * | 2/2012 | McMillen | B60N 2/0232 |
| | | | 701/49 |
| 8,196,887 B2 * | 6/2012 | Dahlbacka | B60N 2/07 |
| | | | 248/424 |
| 8,231,138 B2 * | 7/2012 | Sadr | B60R 21/13 |
| | | | 280/730.2 |
| 8,348,338 B2 * | 1/2013 | Galecka | B60N 2/809 |
| | | | 297/216.12 |
| 8,397,688 B2 * | 3/2013 | Cunningham | F02F 7/006 |
| | | | 123/195 C |
| 8,474,917 B2 * | 7/2013 | Line | B60N 2/5825 |
| | | | 297/188.04 |
| 8,511,748 B2 * | 8/2013 | McLeod | B60N 2/686 |
| | | | 297/216.1 |
| 8,528,295 B2 | 9/2013 | Glynn et al. | |
| 8,540,318 B2 * | 9/2013 | Folkert | B60N 2/686 |
| | | | 297/452.14 |
| 8,584,325 B2 | 11/2013 | Onuma | |
| 8,657,378 B2 * | 2/2014 | Kunert | B60N 2/815 |
| | | | 297/391 |
| 8,911,022 B2 * | 12/2014 | Pleskot | B60N 2/5825 |
| | | | 297/218.3 |
| 8,931,162 B2 | 1/2015 | Gonzalez et al. | |
| 8,967,663 B2 * | 3/2015 | Seki | B60N 2/4228 |
| | | | 280/730.2 |
| 9,126,504 B2 * | 9/2015 | Line | B60N 2/643 |
| 9,365,142 B1 * | 6/2016 | Line | B60N 2/62 |
| 9,409,504 B2 * | 8/2016 | Line | B60N 2/64 |
| 9,415,713 B2 * | 8/2016 | Line | B60N 2/643 |
| 9,421,894 B2 * | 8/2016 | Line | B60N 2/62 |
| 9,562,629 B2 | 2/2017 | Kajiwara et al. | |
| 9,707,870 B2 * | 7/2017 | Line | B60N 2/64 |
| 9,707,873 B2 * | 7/2017 | Line | B60N 2/643 |
| 9,873,360 B2 * | 1/2018 | Line | B60N 2/64 |
| 9,873,362 B2 * | 1/2018 | Line | B60N 2/643 |
| 2003/0025370 A1 * | 2/2003 | Hensel | A47C 7/38 |
| | | | 297/285 |
| 2004/0080176 A1 | 4/2004 | Haraguchi et al. | |

(56) References Cited

U.S. PATENT DOCUMENTS

| | | | |
|---|---|---|---|
| 2005/0035642 A1* | 2/2005 | Hake | F16B 39/282 297/396 |
| 2005/0253033 A1 | 11/2005 | Mizukoshi et al. | |
| 2006/0244301 A1* | 11/2006 | Jeffries | A47C 1/12 297/452.55 |
| 2008/0067850 A1* | 3/2008 | Stenstrom | B60N 2/062 297/353 |
| 2008/0122241 A1* | 5/2008 | Blackmore | B60N 3/101 296/37.8 |
| 2008/0252111 A1* | 10/2008 | Rothkop | B60N 3/004 297/188.04 |
| 2009/0102255 A1* | 4/2009 | D'Agostini | B60N 2/888 297/216.12 |
| 2009/0165263 A1* | 7/2009 | Smith | B60N 2/5825 24/297 |
| 2010/0109397 A1* | 5/2010 | Bandurksi | B60N 2/4279 297/216.12 |
| 2010/0207438 A1* | 8/2010 | Inoue | A61H 1/0244 297/284.2 |
| 2010/0270840 A1* | 10/2010 | Tanaka | B60N 2/2222 297/354.11 |
| 2011/0055720 A1* | 3/2011 | Potter | G06F 3/017 715/747 |
| 2011/0187174 A1* | 8/2011 | Tscherbner | B60N 2/815 297/408 |
| 2011/0272978 A1* | 11/2011 | Nitsuma | B60N 2/888 297/216.12 |
| 2011/0278885 A1* | 11/2011 | Procter | B60R 11/0235 297/135 |
| 2011/0278886 A1* | 11/2011 | Nitsuma | B60N 2/4228 297/216.13 |
| 2011/0298261 A1* | 12/2011 | Holt | A47C 1/023 297/316 |
| 2012/0037754 A1* | 2/2012 | Kladde | B60N 2/181 244/122 R |
| 2012/0063081 A1* | 3/2012 | Grunwald | B60R 11/0235 361/679.41 |
| 2012/0161481 A1* | 6/2012 | Tache | A47C 7/72 297/217.3 |
| 2013/0015643 A1* | 1/2013 | Gorman | B60R 21/207 280/730.2 |
| 2013/0119741 A1* | 5/2013 | Medoro | B60N 2/686 297/452.18 |
| 2013/0241255 A1* | 9/2013 | Kulkarni | B60N 2/028 297/285 |
| 2013/0320742 A1* | 12/2013 | Murolo | B60N 2/68 297/452.18 |
| 2014/0058305 A1* | 2/2014 | Batterson | A61F 5/012 602/13 |
| 2014/0180181 A1* | 6/2014 | von Oepen | A61H 23/0236 601/47 |
| 2014/0203603 A1* | 7/2014 | Line | B60N 2/64 297/218.1 |
| 2014/0373314 A1 | 12/2014 | Machida et al. | |
| 2015/0102650 A1* | 4/2015 | Hosbach | B60N 2/68 297/452.18 |
| 2015/0251579 A1* | 9/2015 | Line | B60N 2/64 297/452.18 |
| 2015/0283970 A1* | 10/2015 | Line | B60N 2/58 280/728.3 |
| 2016/0046245 A1 | 2/2016 | Kajiwara et al. | |
| 2016/0082871 A1 | 3/2016 | Kwon | |
| 2016/0096449 A1* | 4/2016 | Line | B60N 2/2222 297/354.11 |
| 2016/0096450 A1* | 4/2016 | Kondrad | B60N 2/7094 297/285 |

* cited by examiner

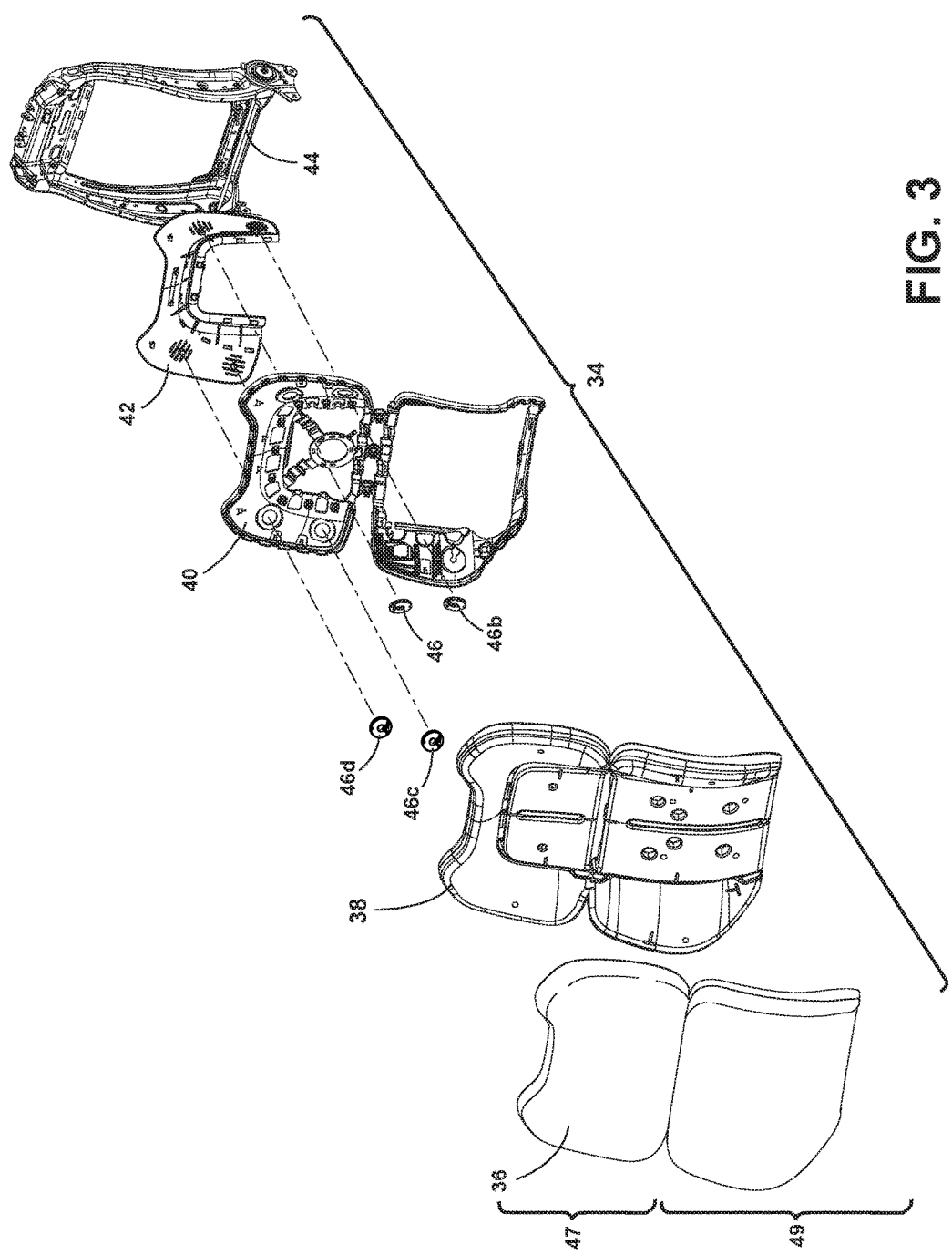

… the planar surface of the first snap-fit component is the rearward side of the contact portion;

the first snap-fit connection component and the second snap-fit connection component of the grommet extend inward relative to the inside cylindrical surface of the connection section and toward the extension portion of the first snap-fit component of the closeout panel;

the grommet further comprises: a centerline dividing the channel into two sections;

a third snap-fit connection component disposed at the connector section, the third snap-fit connection component including a retaining surface that abuts the planar surface of the first snap-fit component of the closeout panel and extends inward relative to the inside cylindrical surface of the connection section and toward the extension portion of the first snap-fit component of the closeout panel;

the retaining surface of the first snap-fit connection component, the retaining surface of the second snap-fit connection component, and the retaining surface of the third snap-fit connection component each include a center;

the center of the retaining surface of the first snap-fit connection component extends into one section of the channel;

the center of the retaining surface of the second snap-fit connection component and the center of the retaining surface of the third snap-fit connection component extend into the other section of the channel; and the grommet further including a poke-yoke boss, the trim carrier further includes a poke-yoke boss receiver, and the poke-yoke boss receiver has received the poke-yoke boss of the grommet.

According to a third aspect of the present invention, a grommet to interconnect a trim carrier and a closeout panel in a seating assembly in a vehicle comprises: a first snap-fit connection component including a retaining surface configured to face and abut a planar surface of a snap-fit component of the closeout panel; and a second snap-fit connection component including a retaining surface configured to abut a surface of the snap-fit component or another snap-fit component of the closeout panel; wherein, the first snap-fit connection component resists separating from the closeout panel when a force is applied to the grommet from a first direction to a greater degree than the second snap-fit component resists separating from the closeout panel when a force is applied to the grommet from a second direction, opposite the first direction.

Embodiments of the third aspect of the invention can include any one or a combination of the following features:

a connection section, including the first snap-fit connection component and the second snap-fit connection component;

a first section extending orthogonally from the connection section, the first section having a planar forward facing surface;

the connection section includes an outside cylindrical surface, an inside cylindrical surface to the inside of the outside cylindrical surface, and a channel to the interior of the inside cylindrical surface;

the first section extends orthogonally outward from the inside cylindrical surface of the connection section;

the first snap-fit connection component and the second snap-fit connection component extend inward relative to the inside cylindrical surface of the connection section;

the retaining surface of the first snap-fit connection component is parallel with, and faces the same direction as, the planar forward facing surface of the first section;

a centerline dividing the channel into two sections;

a third snap-fit connection component disposed at the connection section, the third snap-fit connection component including a retaining surface configured to abut a surface of the snap-fit component or another snap-fit component of the closeout panel;

the third snap-fit connection component extends inward relative to the inside cylindrical surface of the connection section;

the retaining surface of the first snap-fit connection component, the retaining surface of the second snap-fit connection component, and the retaining surface of the third snap-fit connection component each include a center;

the center of the retaining surface of the first snap-fit connection component extends into one section of the channel;

the center of the retaining surface of the second snap-fit connection component and the center of the retaining surface of the third snap-fit connection component extend into the other section of the channel;

the first section further includes an internally facing surface on the other side of the first section as the planar forward facing surface and a poke-yoke boss extending from the internally facing surface;

the connection section includes a cylindrical lip; and the poke-yoke boss and the cylindrical lip of the connection section are configured to be received by trim carrier.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is an exploded perspective view of the seatback of FIG. 2, illustrating a closeout panel interconnected with a trim carrier via multiple grommets;

DETAILED DESCRIPTION OF THE PREFERRED EMBODIMENTS

Figure 1:
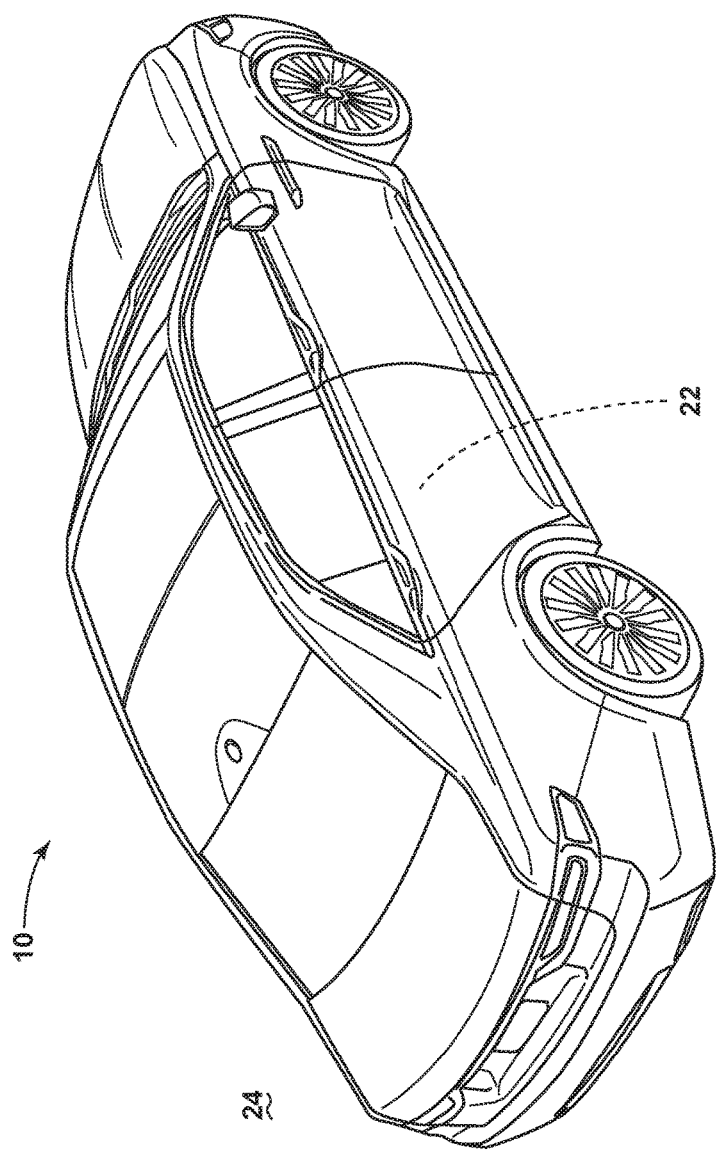
FIG. 1 is a perspective view of a vehicle.

For purposes of description herein, the terms "upper," "lower," "rearward," "forward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 10 is illustrated, having an interior 22 at least partially separated from an exterior.

Figure 2:
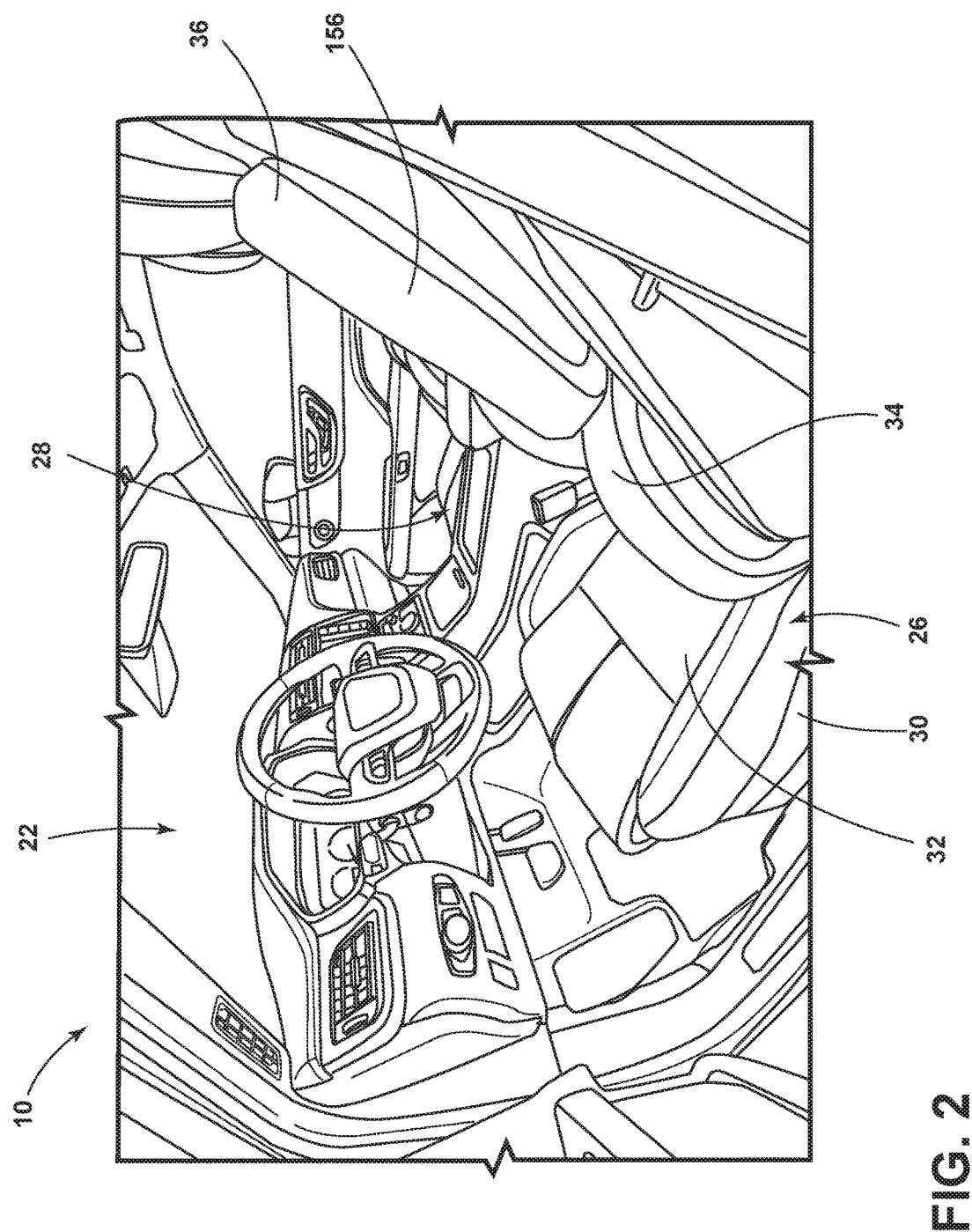
FIG. 2 is a perspective view of an interior of the vehicle of FIG. 1, illustrating a first seating assembly, including a seat and a seatback.
Figure 2A:
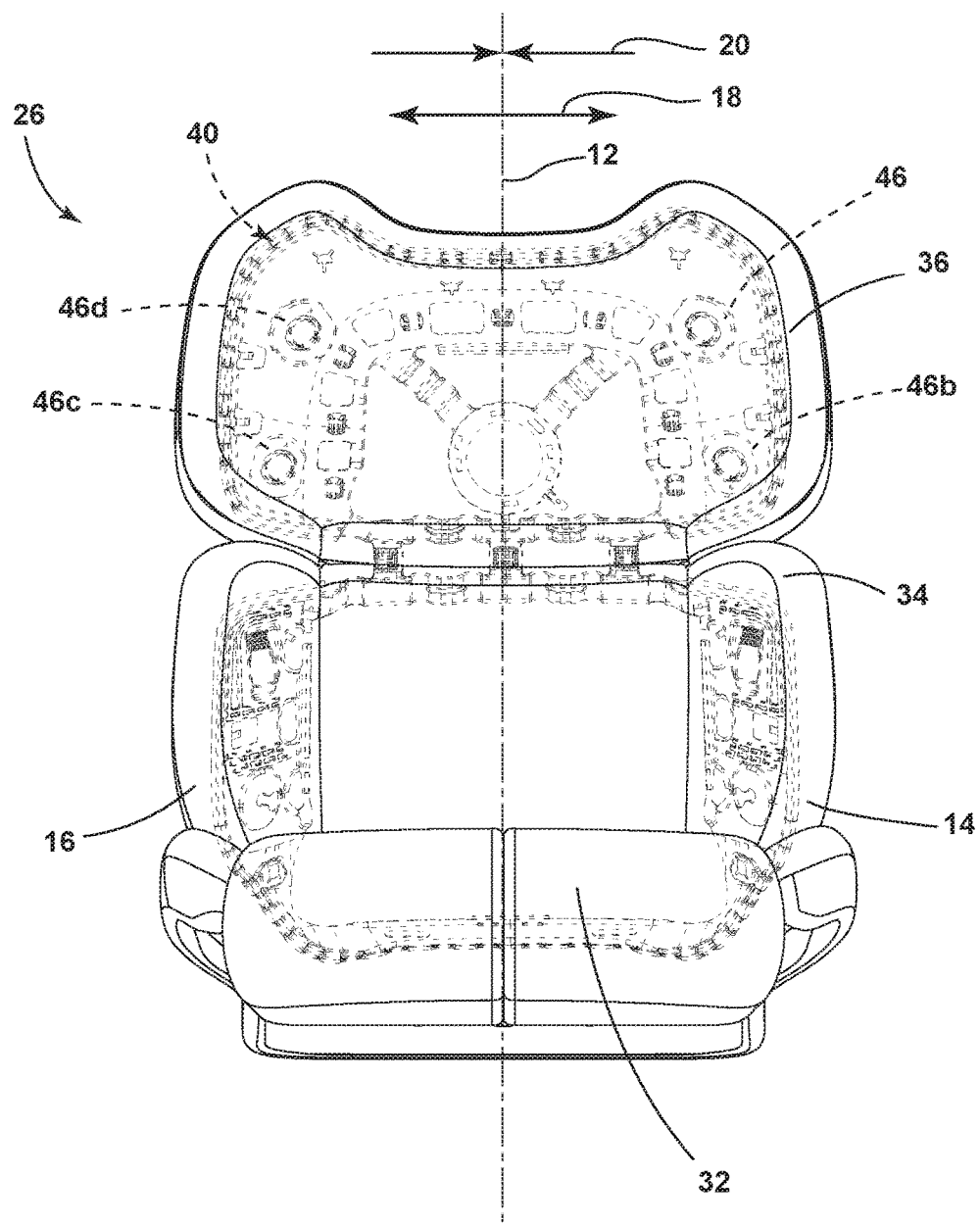
FIG. 2A is a front view of the first seating assembly of FIG. 2, illustrating a midline dividing the first seating assembly approximately in half and providing a basis for an outboard direction and an inboard direction.
Figure 4:
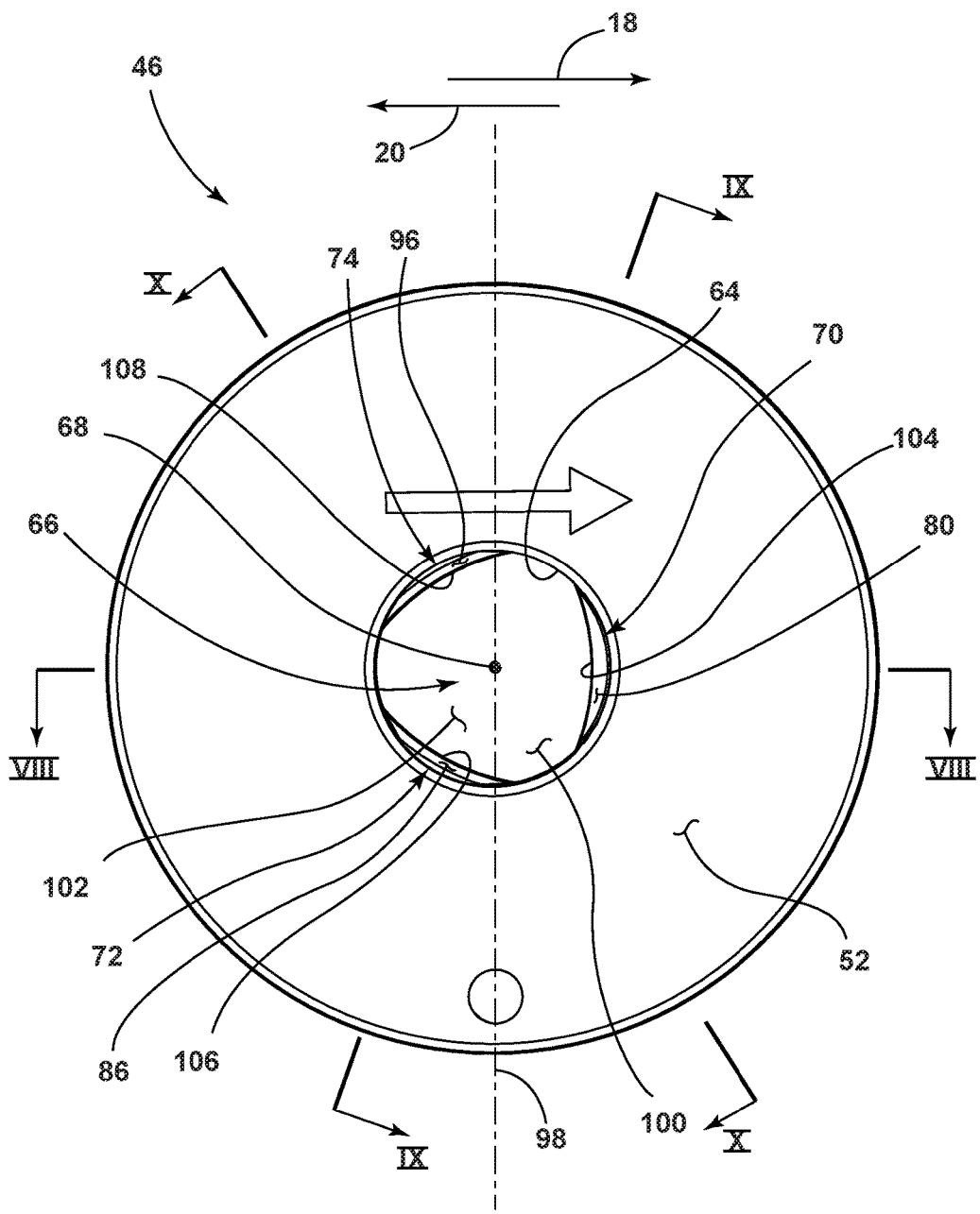
FIG. 4 is a front view of one of the grommets of FIG. 3, illustrating a planar forward facing surface surrounding a channel and three snap-fit connection components disposed around the channel.

Referring now to FIGS. 2 and 2A, the vehicle 10 further includes a first seating assembly 26 in the interior 22 and a second seating assembly 28 in the same row of seating 30. Because the second seating assembly 28 is identical to the first seating assembly 26 for purposes of this disclosure, only the first seating assembly 26 will hereinafter be discussed. The first seating assembly 26 includes seat 32, configured to support a lower half of an occupant (not shown) of the vehicle 10, and a seatback 34 typically in pivotal relationship with the seat 32 configured to support an upper half of an occupant. The first seating assembly 26 further includes a midline 12 at least approximately down the middle of the first seating assembly, approximately dividing the first seating assembly 26 in half (forming one half 14 and another half 16) and providing a basis defining an outboard direction 18 directed away from the midline 12 and an inboard direction 20 directed toward the midline 12.

Referring now to FIG. 3, the seatback 34 comprises trim, which includes an external fabric 36 that contacts the occupant and cushioning 38, a trim carrier 40, a closeout panel 42, and structural support 44. The seatback 34 further includes grommets 46 and 46b-d. The grommets 46 and 46b-d are attached to the trim carrier 40. Each of the grommets 46 and 46b-d provide a snap-fit connection between the trim carrier 40 and the closeout panel 42. In other words, the grommets 46 and 46b-d interconnect the trim carrier 40 and the closeout panel 42. However, the structure of the grommets 46 and 46b-d providing the snap-fit connections between the trim carrier 40 and the closeout panel 42, which is detailed below, could be provided by the trim carrier 40 alone, and the grommets 46 and 46b-d can be thought of as part of the trim carrier 40. Because the structure of each of the grommets 46 and 46b-d are the same, only grommet 46 will be discussed particularly herein. However, as discussed more fully below, grommets 46 and 46b disposed to one side of the midline 12 of the first seating assembly 26 (i.e., at the one half 14 of the first seating assembly 26) are oriented oppositely (i.e., rotated 180 degrees) as grommets 46c and 46d disposed to the other side of the midline 12 (i.e., at the other half 16 of the first seating assembly 26). The seatback 34 can be divided into a lower lumbar section 49 and an upper thoracic section 47.

Figure 5:
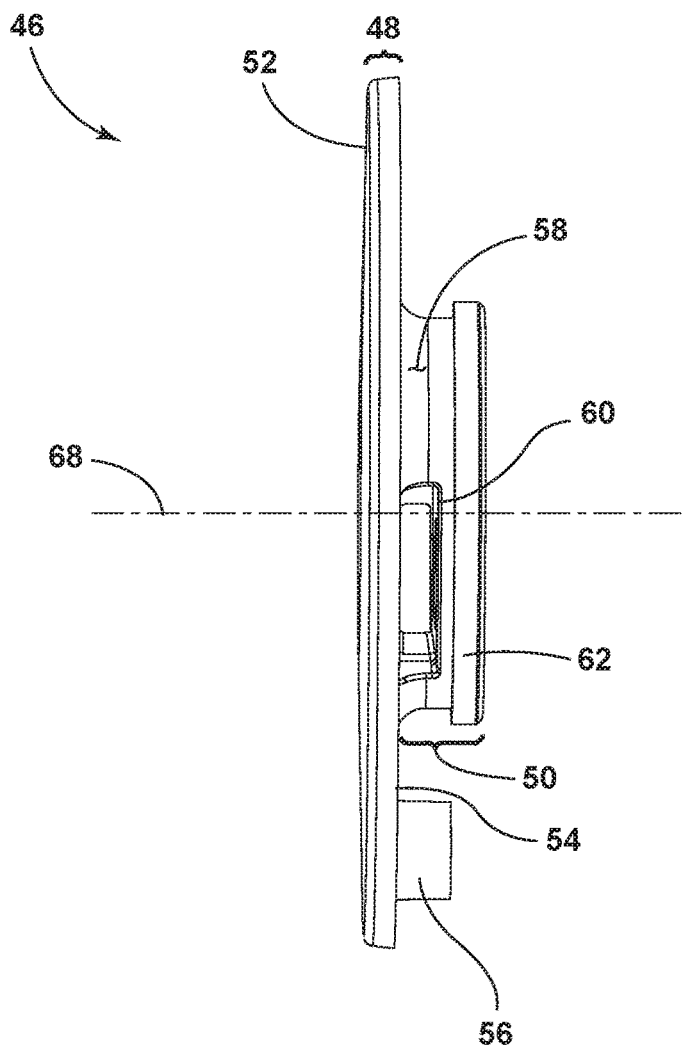
FIG. 5 is a side view of the grommet of FIG. 4, illustrating a first section extending generally orthogonally from a connection section.

Referring now to FIGS. 4-10, the grommet 46 includes a first section 48 and a connection section 50 (see particularly FIG. 5). The first section 48 extends generally orthogonally from the connection section 50. The first section 48 includes a generally planar forward facing surface 52 and an internally facing surface 54 on the other side of the first section 48 as the planar forward facing surface 52. A poke-yoke boss 56 extends, in this embodiment generally rearward and orthogonally, from the internally facing surface 54. The poke-yoke boss 56 mates with (that is, is configured to be received by) a receiver disposed on the trim carrier 40, as discussed further below, to ensure proper placement of the grommet 46 on the trim carrier 40.

The connection section 50 includes an outside cylindrical surface 58, which may be contiguous or include various apertures 60, and a cylindrical lip 62 extending orthogonally outward from the outside cylindrical surface 58. The cylindrical lip 62 is configured to be received by the trim carrier 40 in snap-fit fashion, to connect the grommet 46 to the trim carrier 40, as discussed further below. The connection section 50 further includes an inside cylindrical surface 64, which is disposed inside of the outside cylindrical surface 58. The connection section 50 further includes a channel 66 to the interior of and partially bounded by the inside cylindrical surface 64. The channel 66 includes an axis 68. The first section 48 extends orthogonally outward relative to the axis 68 and orthogonally outward from the inside cylindrical surface 64 of the connection section 50.

The connection section 50 of the grommet 46 further includes a first snap-fit connection component 70, a second snap-fit connection component 72, and a third snap-fit connection component 74. The first snap-fit connection component 70, the second snap-fit connection component 72, and the third snap-fit connection component 74 all extend from the inside cylindrical surface 64 inward toward the axis 68 of the channel 66. In other words, the first snap-fit connection component 70, the second snap-fit connection component 72, and the third snap-fit connection component 74 project into the channel 66.

Figure 6:
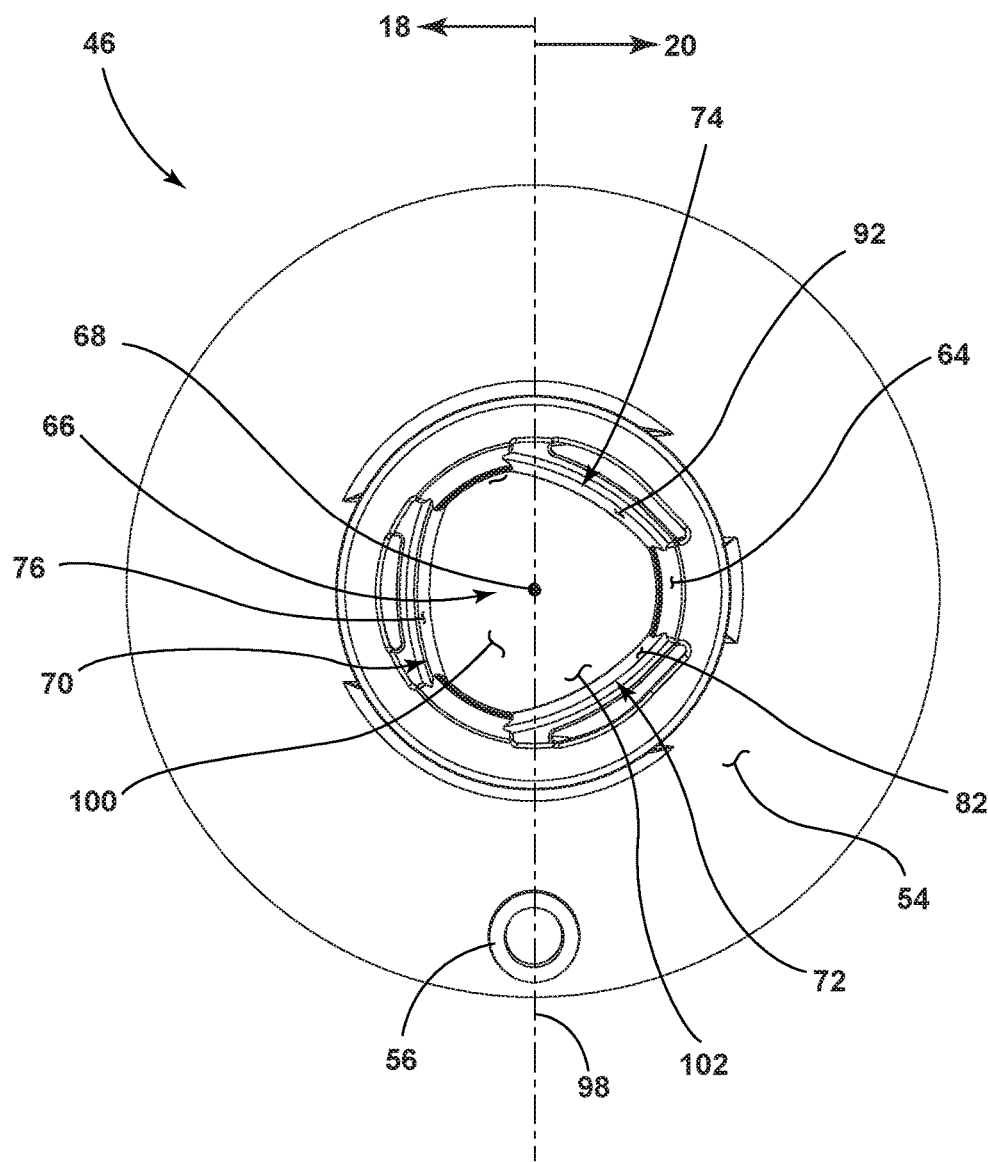
FIG. 6 is a rear view of the grommet of FIG. 4, illustrating a first snap-fit connection component, a second snap-fit connection component, and a third snap-fit connection component extending from an inside cylindrical surface toward an axis of a channel.
Figure 7:
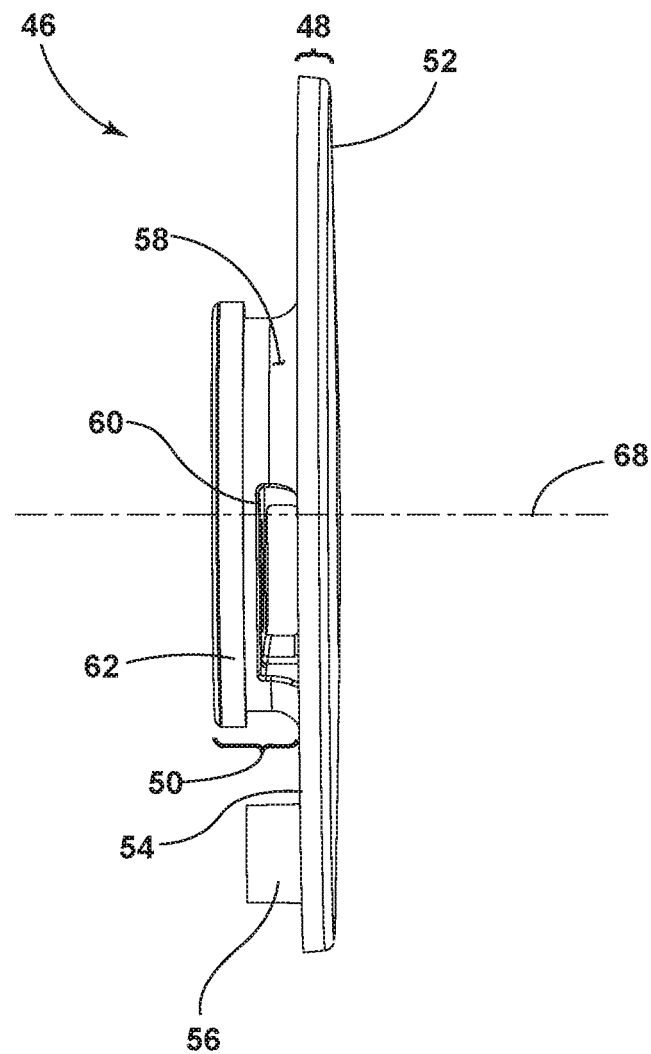
FIG. 7 is another side view of the grommet of FIG. 4, illustrating an outside cylindrical surface and a cylindrical lip extending outward from the outside cylindrical surface.
Figure 8:
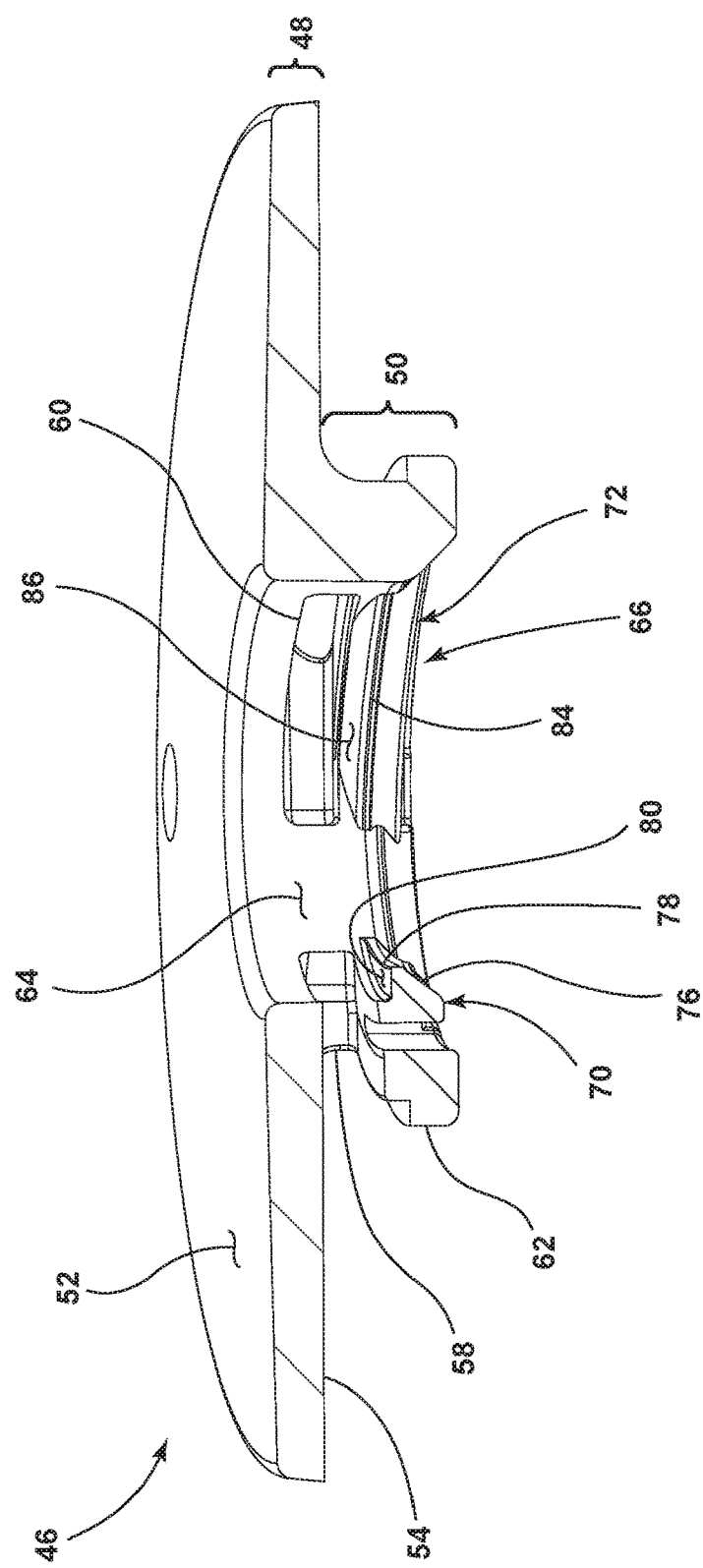
FIG. 8 is a perspective view of a cross-section of the grommet of FIG. 4 taken along line VIII-VIII of FIG. 4, illustrating a retaining surface and a deformation surface of the first snap-fit component coinciding at an apex.
Figure 9:
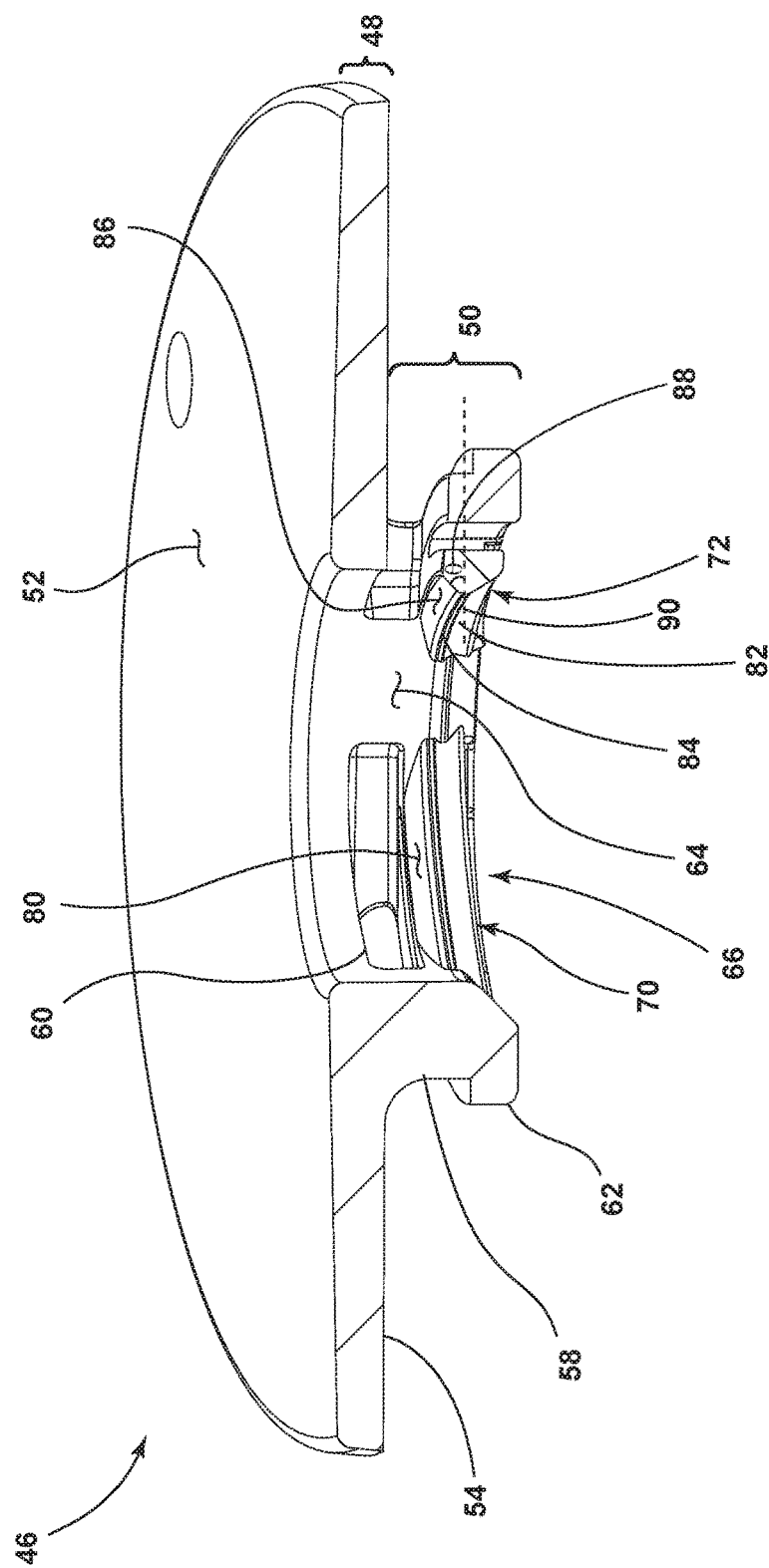
FIG. 9 is a perspective view of a cross-section of the grommet of FIG. 4 taken along line IX-IX of FIG. 4, illustrating a retaining surface and a deformation surface of the second snap-fit component coinciding an at apex.

The first snap-fit connection component 70 includes a generally rearward facing deformation surface 76 extending inward relative to the inside cylindrical surface 64 (see particularly FIG. 6). The deformation surface 76 ends at an apex 78. The first snap-fit connection component 70 further includes a retaining surface 80 extending from the inside cylindrical surface 64 forward of the deformation surface 76 and also ending at the apex 78 (see particularly FIG. 4). The retaining surface 80 is parallel with, and faces the same generally forward direction as, the planar forward facing surface 52 of the first section 48. The retaining surface 80 extends orthogonally from the inside cylindrical surface 64 and is orthogonal to the axis 68 of the channel 66. As discussed further below, a snap-fit component of the closeout panel 42 contacts the deformation surface 76 and is forced to and over the apex 78, resulting in a planar surface of the snap-fit component facing and abutting the retaining surface 80 of the first snap-fit connection component 70 of the grommet 46. The retaining surface 80, facing and abutting the planar surface of the snap-fit component of the closeout panel 42, thereafter resists separation of the grommet 46 (and therefore of the trim carrier 40) from the closeout panel 42.

The second snap-fit connection component 72 likewise includes a generally rearward facing deformation surface 82 extending inward relative to the inside cylindrical surface 64 (see particularly FIG. 6). The deformation surface 82 ends at an apex 84. The second snap-fit connection component 72 further includes a retaining surface 86 (see particularly FIG. 9). The retaining surface 86 faces generally forward at approximately an angle 88 (here of approximately 45 degrees) defined by an axis 90 through the apex 84 orthogonal to the inside cylindrical surface 64. Again as discussed below, a snap-fit component of the closeout panel 42 contacts the deformation surface 82 and is forced to and over the apex 84, resulting in the snap-fit component abutting the retaining surface 86 of the second snap-fit connection component 72 of the grommet 46. The retaining surface 86, facing and abutting the snap-fit component of the closeout panel 42, thereafter resists separation of the grommet 46 (and therefore of the trim carrier 40) from the closeout panel 42. The snap-fit component of the closeout panel 42 that interacts with the first snap-fit connection component 70 can be the same or different component as the snap-fit component that interacts with the second snap-fit connection component 72.

Figure 10:
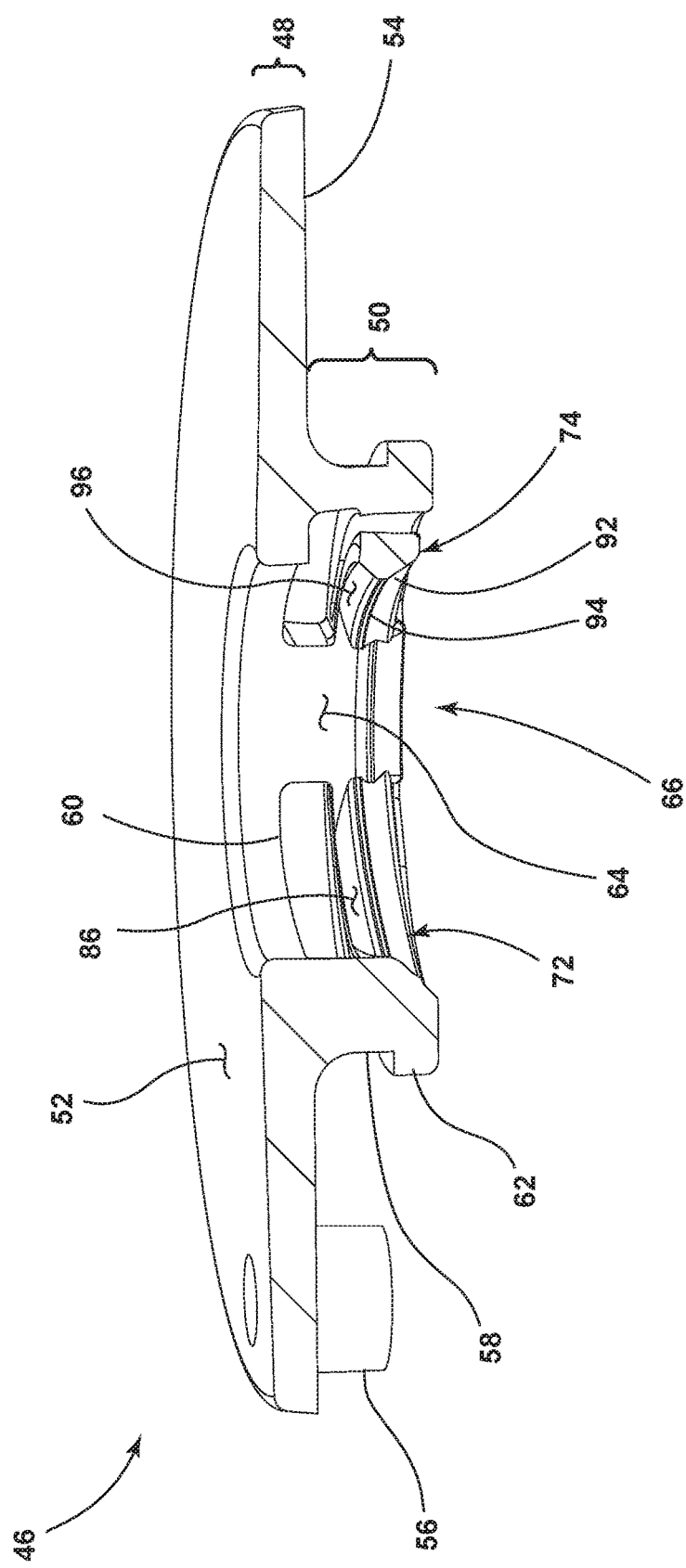
FIG. 10 is a perspective view of a cross-section of the grommet of FIG. 4 taken along line X-X of FIG. 4, illustrating a retaining surface and a deformation surface of the third snap-fit component coinciding an at apex.
Figure 11:
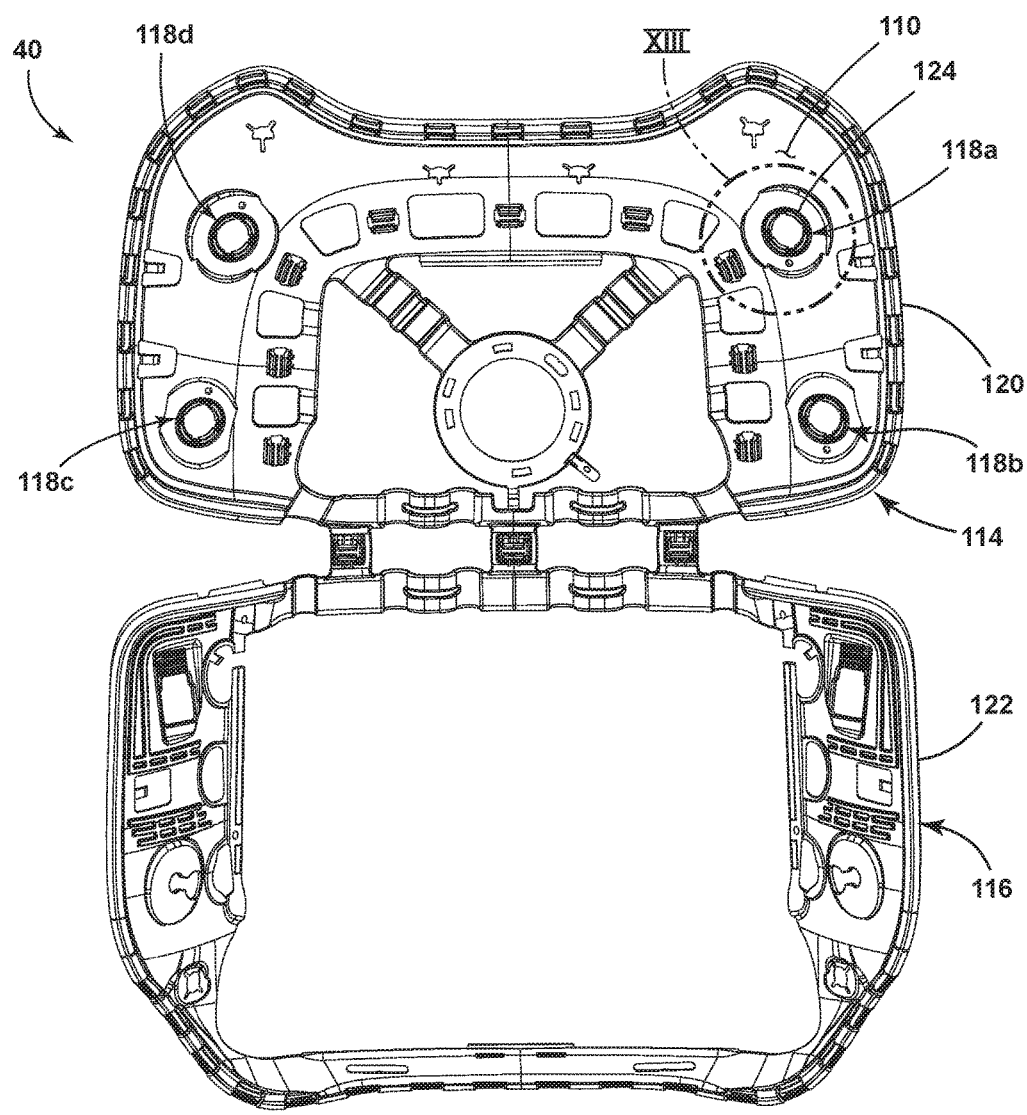
FIG. 11 is a front view of the trim carrier of FIG. 3, illustrating multiple grommet receivers disposed near a perimeter of an upper thoracic section of the trim carrier.
Figure 12:
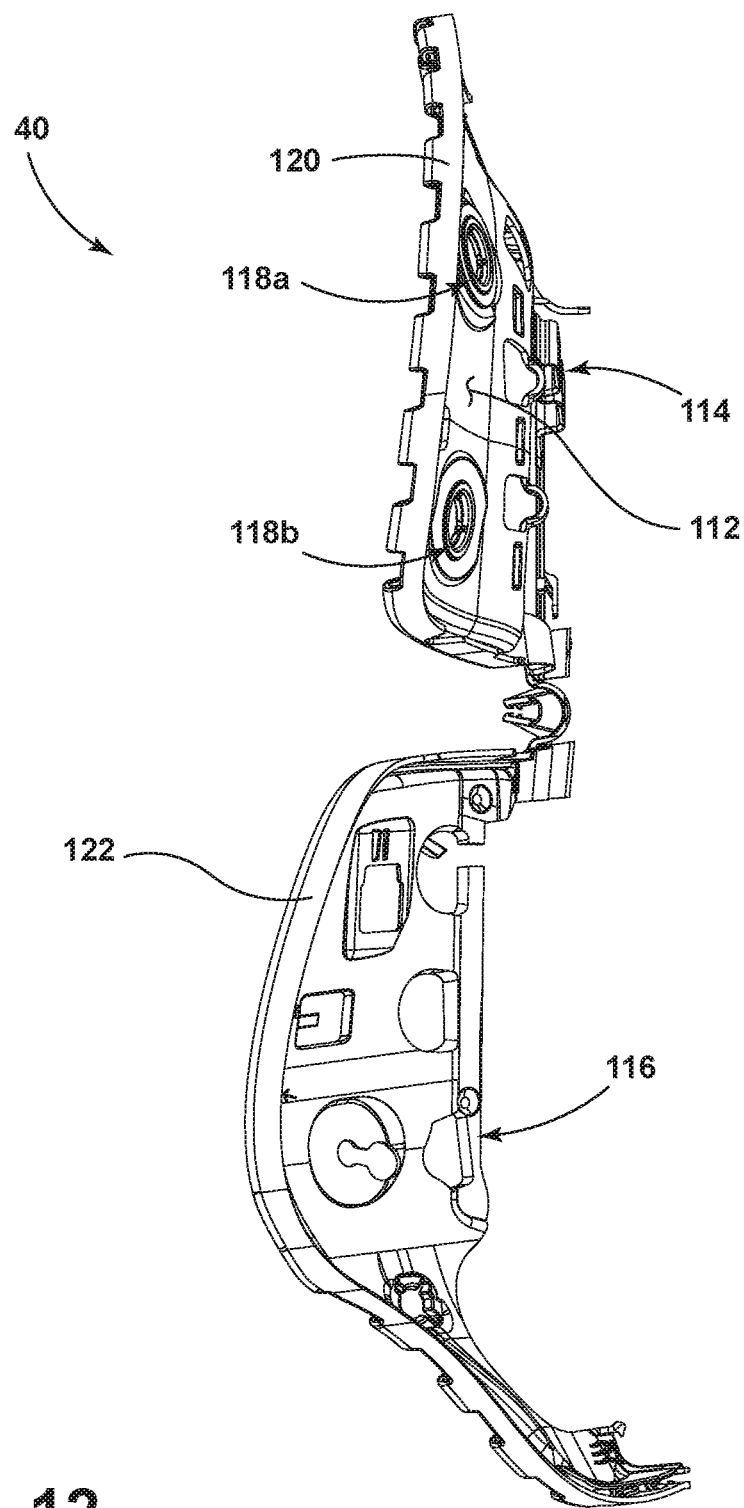
FIG. 12 is a side view of the trim carrier of FIG. 3, illustrating a rear facing surface of the trim carrier.
Figure 13:
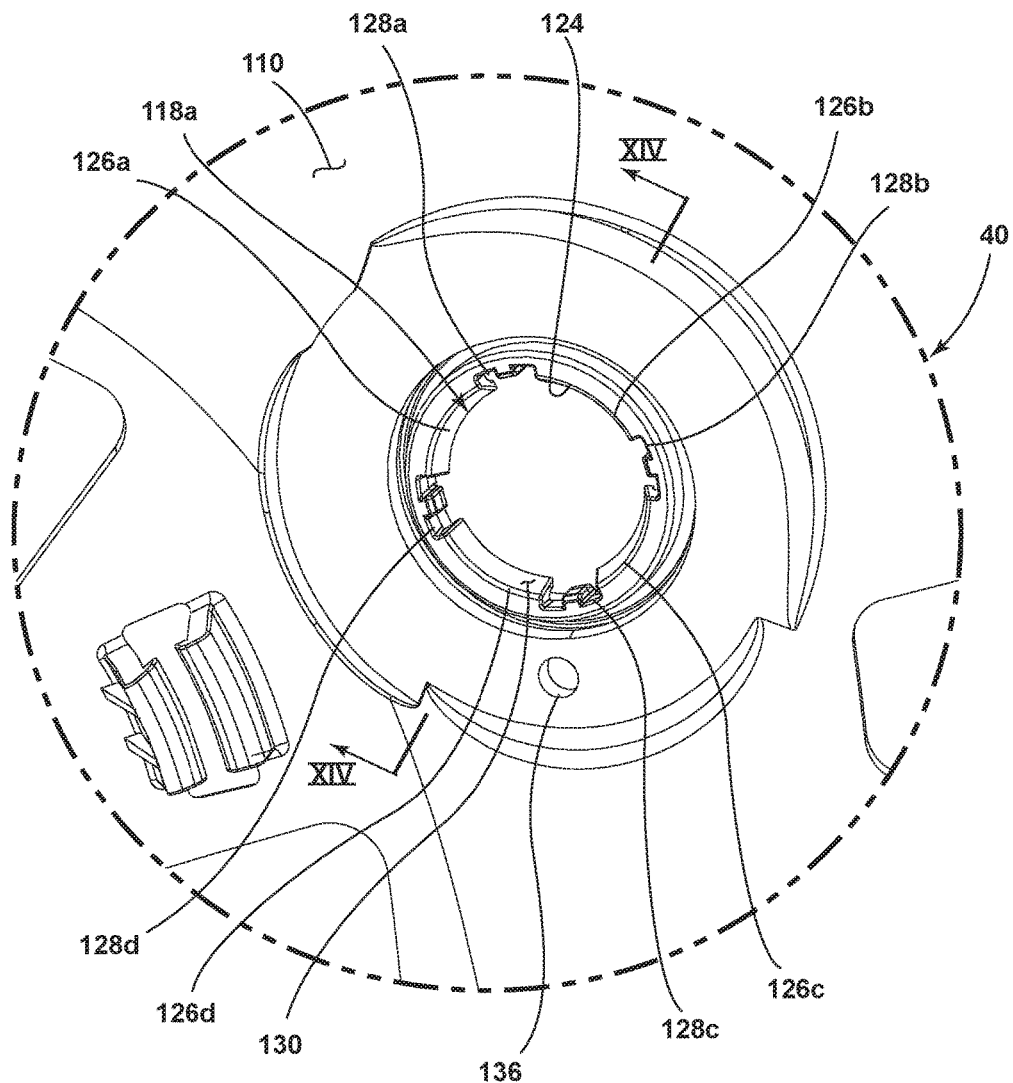
FIG. 13 is a perspective, close-up, view of area XIII of FIG. 11 of the trim carrier of FIG. 3, illustrating multiple snap-fit lips arranged in an arc around an aperture of a grommet receiver.
Figure 14:
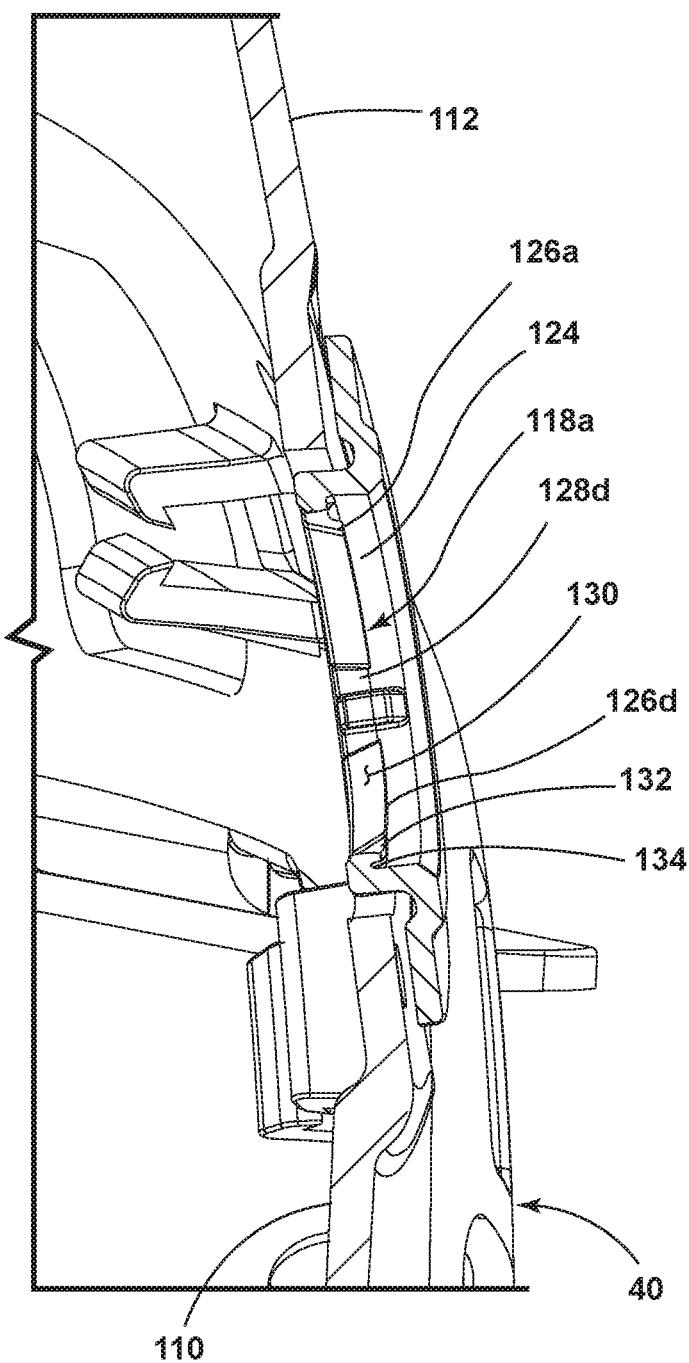
FIG. 14 is a side view of the cross-section taken along line XIV-XIV of FIG. 13, illustrating a contact surface of a snap-fit lip culminating in an apex and transitioning into an undercut.
Figure 15:
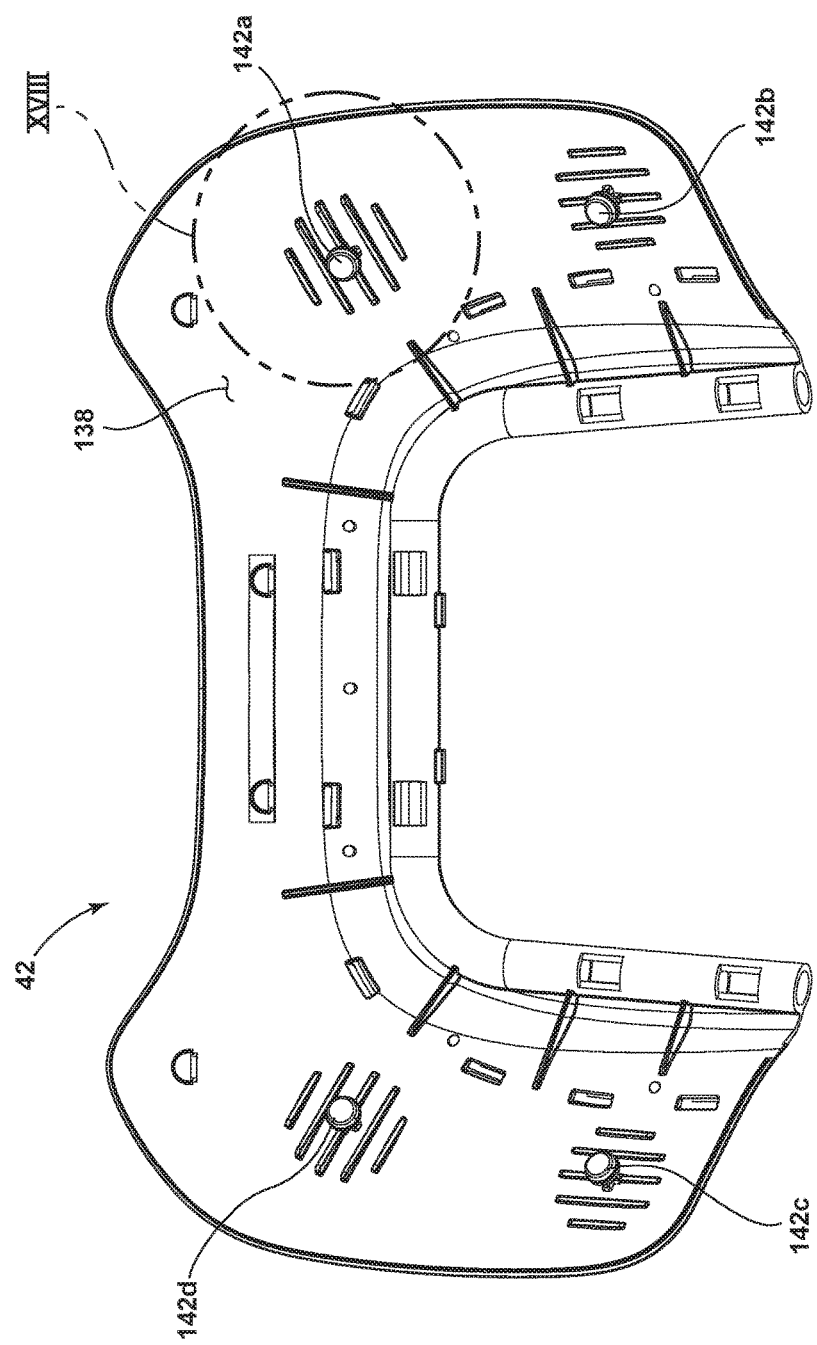
FIG. 15 is a front view of the closeout panel of FIG. 3, illustrating multiple snap-fit components, including a first snap-fit component, extending generally forward from a forward facing surface.
Figure 16:
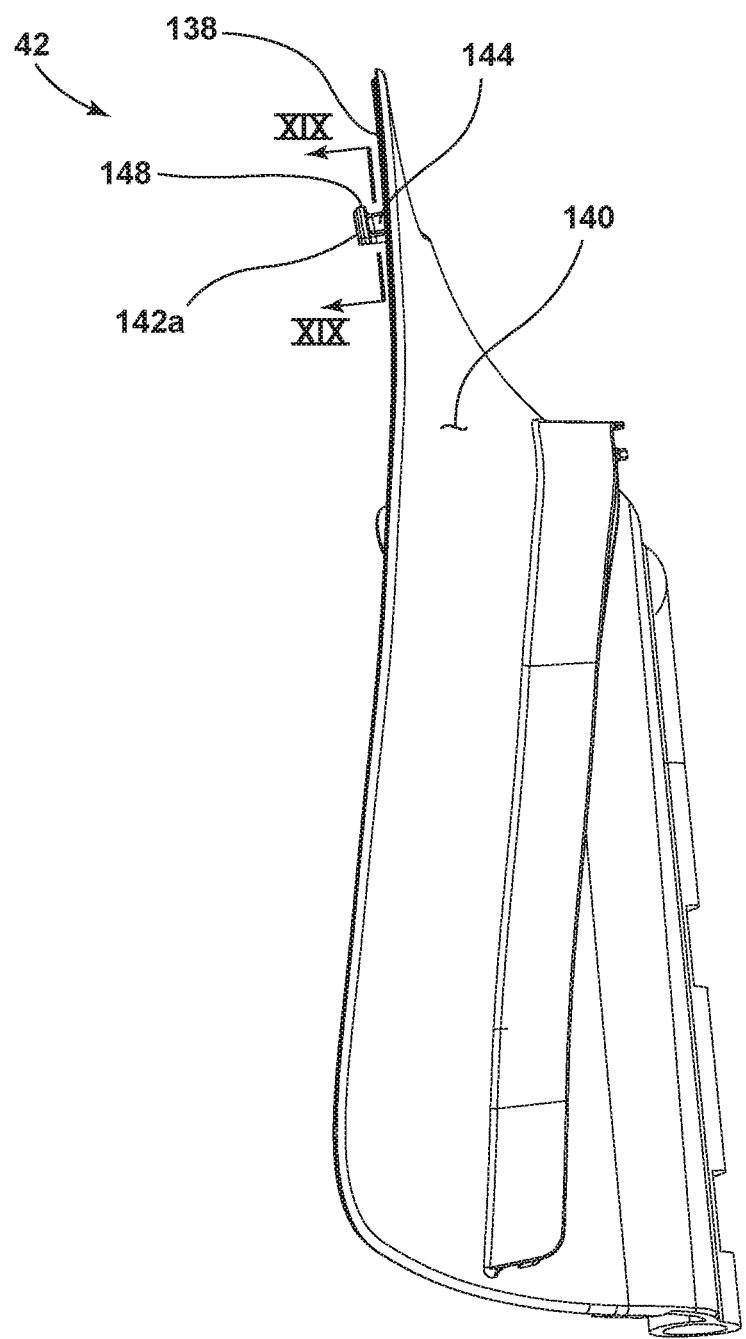
FIG. 16 is a side view of the closeout panel of FIG. 3, illustrating a rearward facing surface on the opposite side of the closeout panel as the forward facing surface.
Figure 17:
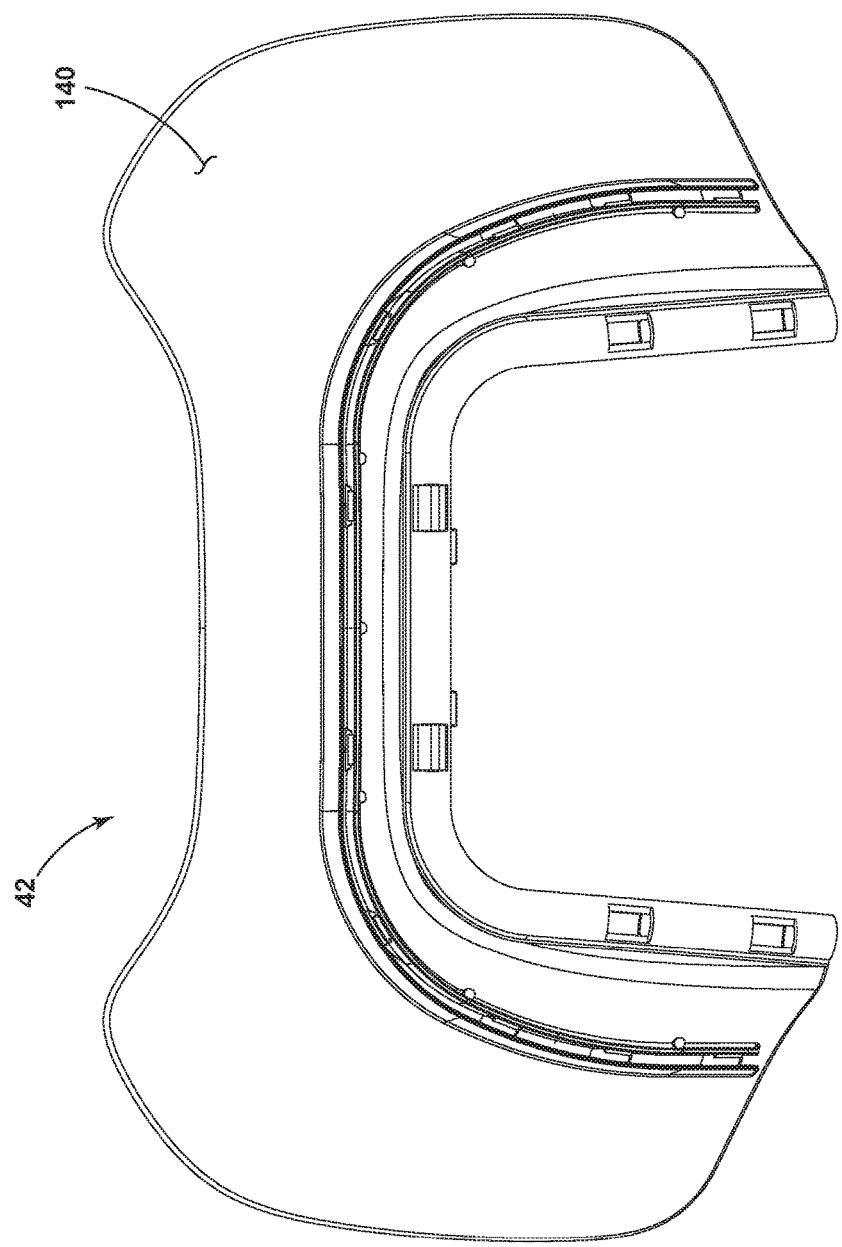
FIG. 17 is a rear view of the closeout panel of FIG. 3, illustrating the rearward facing surface.
Figure 18:
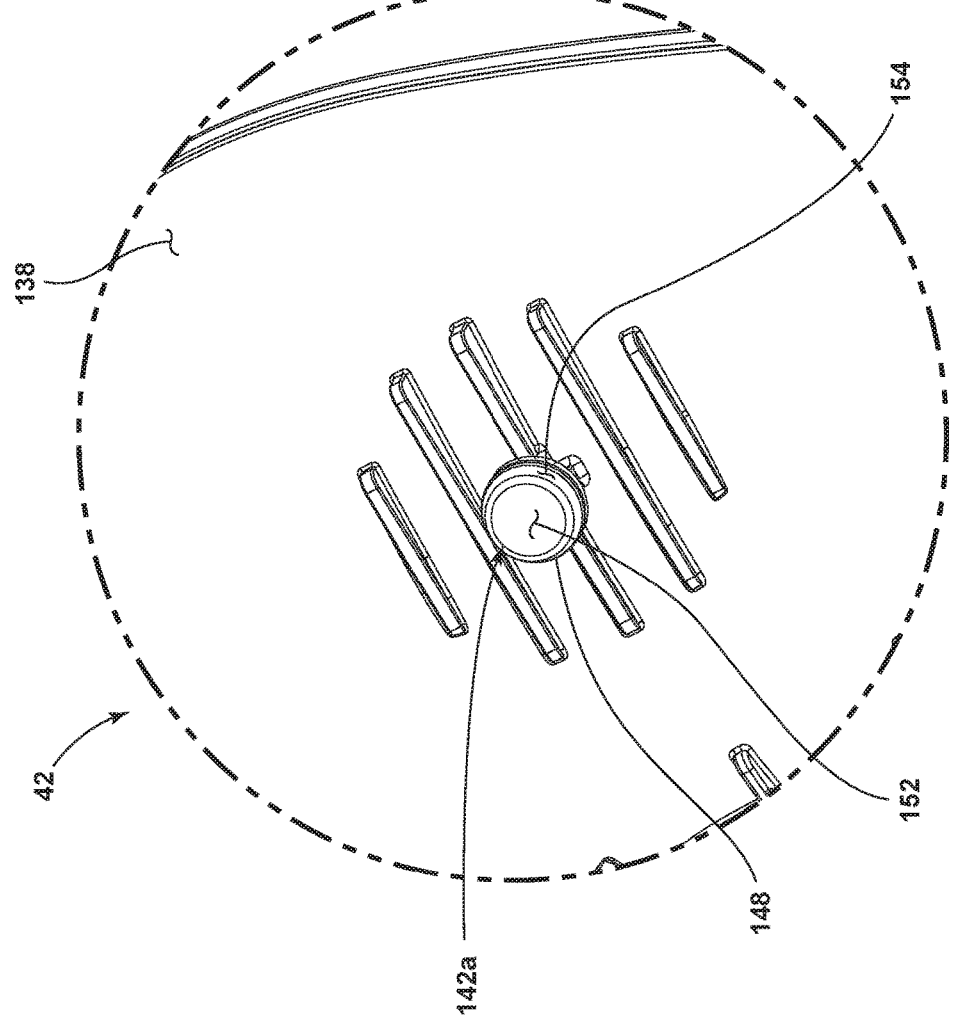
FIG. 18 is a perspective close-up view of area XVIII of FIG. 15, illustrating a contact portion of the first snap-fit component with an angled surface leading to a forward surface.
Figure 19:
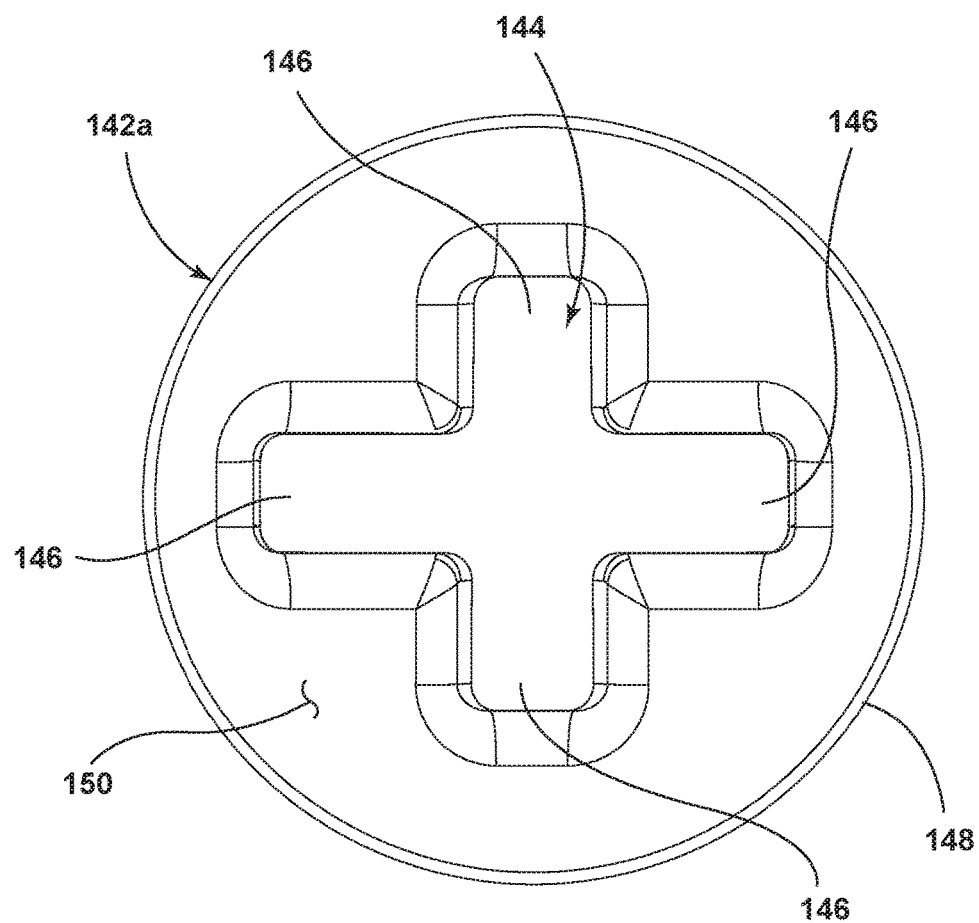
FIG. 19 is a rear view of the cross-section of the first snap-fit component of the closeout panel of FIG. 3, taken through line XIX-XIX of FIG. 16, illustrating a planar surface on the rearward side of the contact portion.
Figure 20:
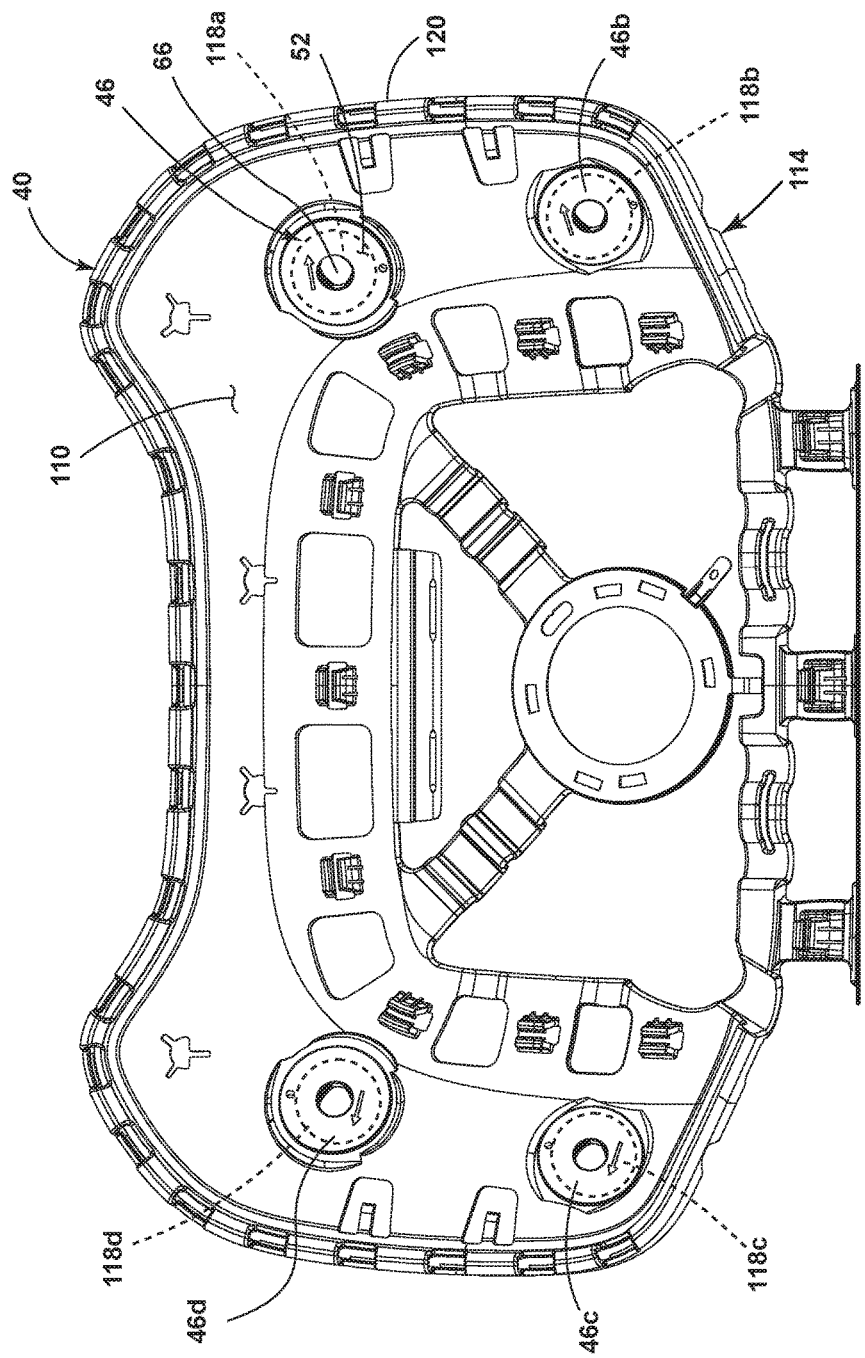
FIG. 20 is a front view of the upper thoracic section of the trim carrier of FIG. 3, illustrating the grommet receivers having received the grommets.
Figure 21:
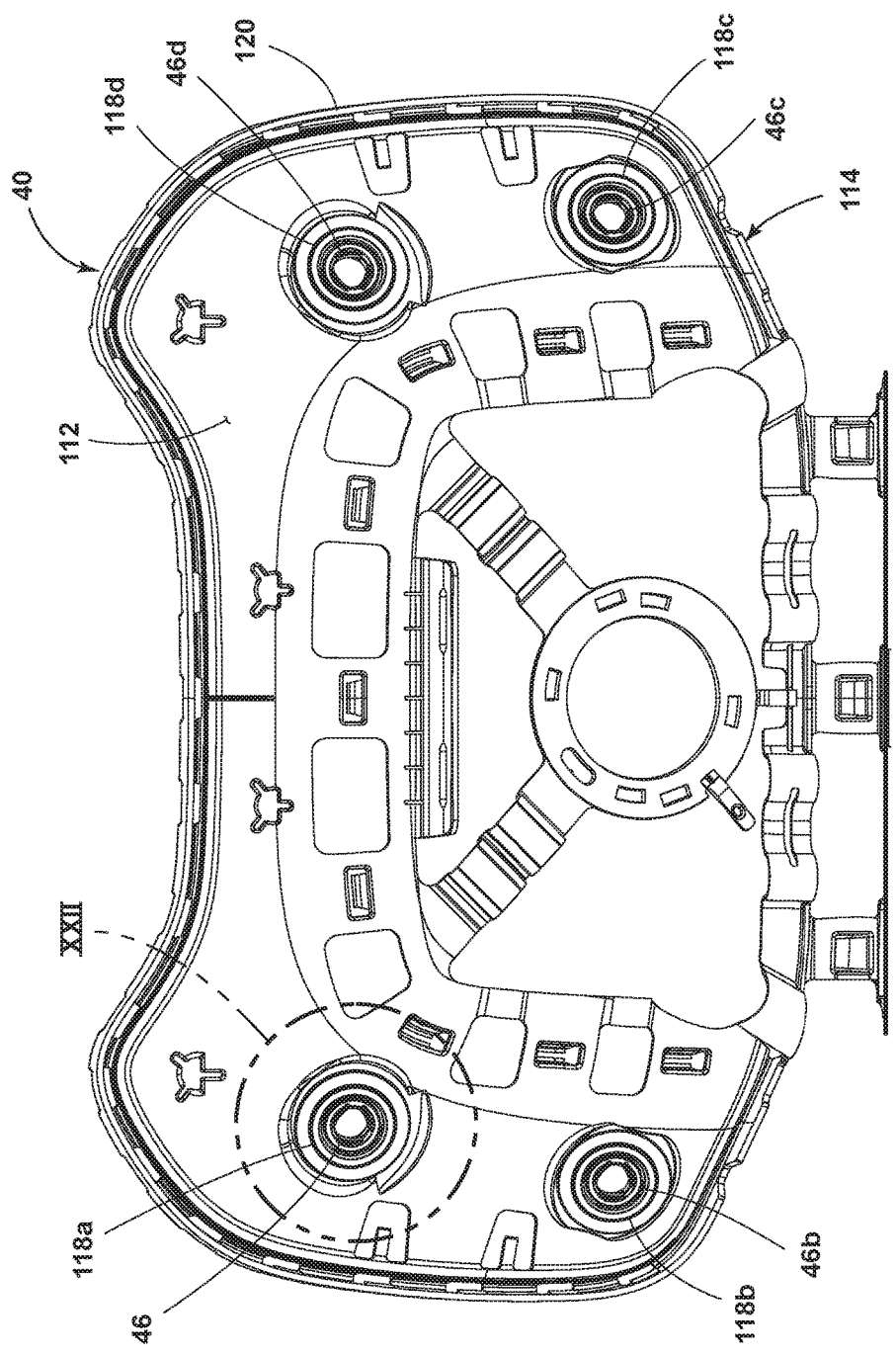
FIG. 21 is a rear view of the upper thoracic section of the trim carrier of FIG. 3, illustrating the grommet receivers having received the grommets.
Figure 22:
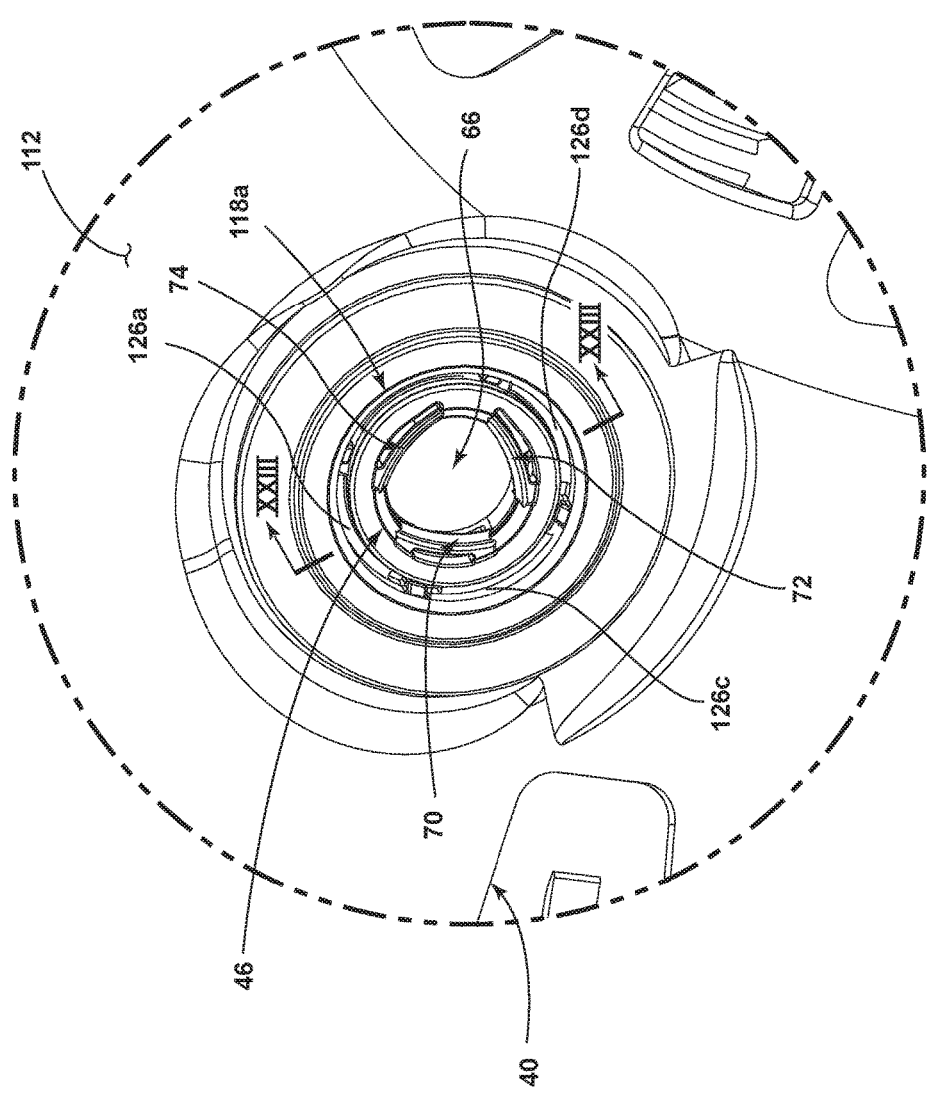
FIG. 22 is a rear close-up view of area XXII from FIG. 21, illustrating one of the grommet receivers having received one of the grommets, in snap-fit fashion.
Figure 23:
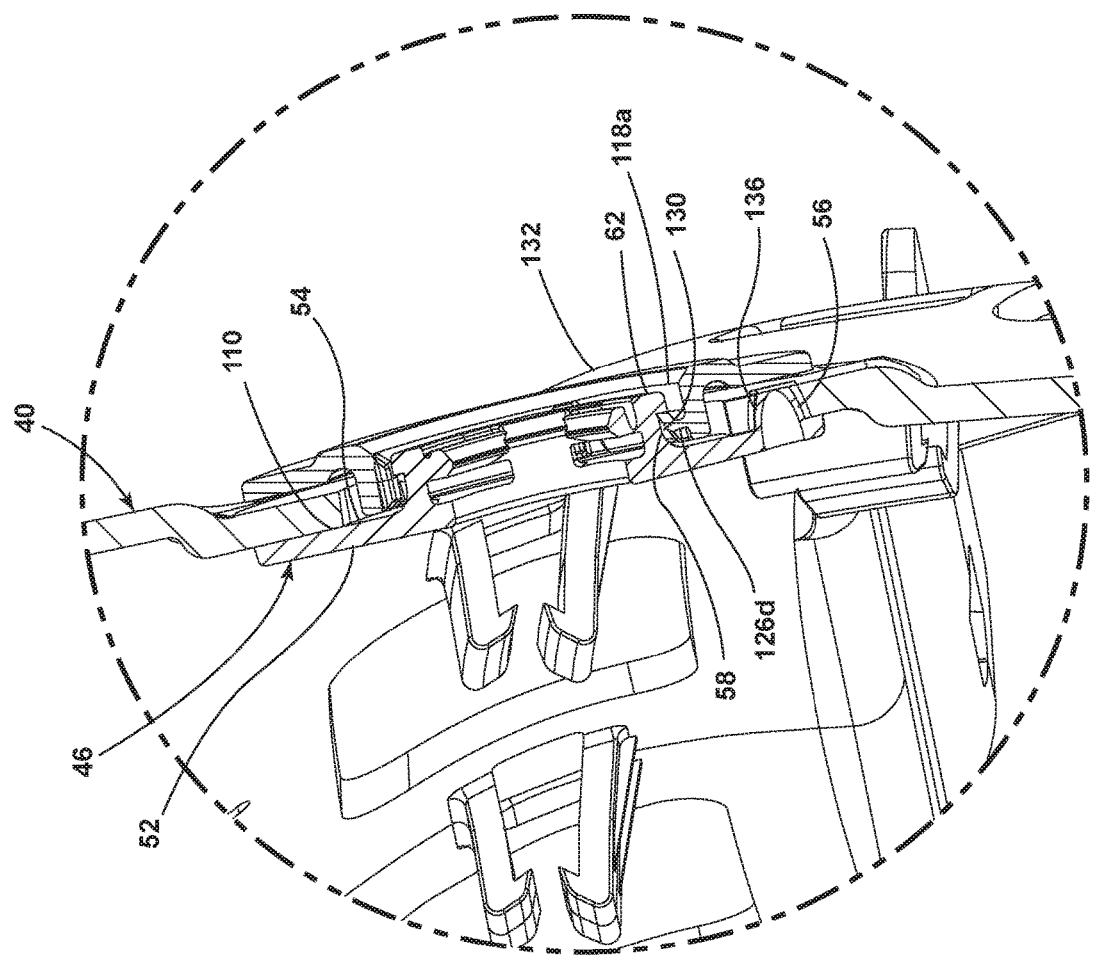
FIG. 23 is a side view of the cross-section taken through line XXIII-XXIII of FIG. 22, illustrating one of the grommet receivers having received one of the grommets, in snap-fit fashion.
Figure 24:
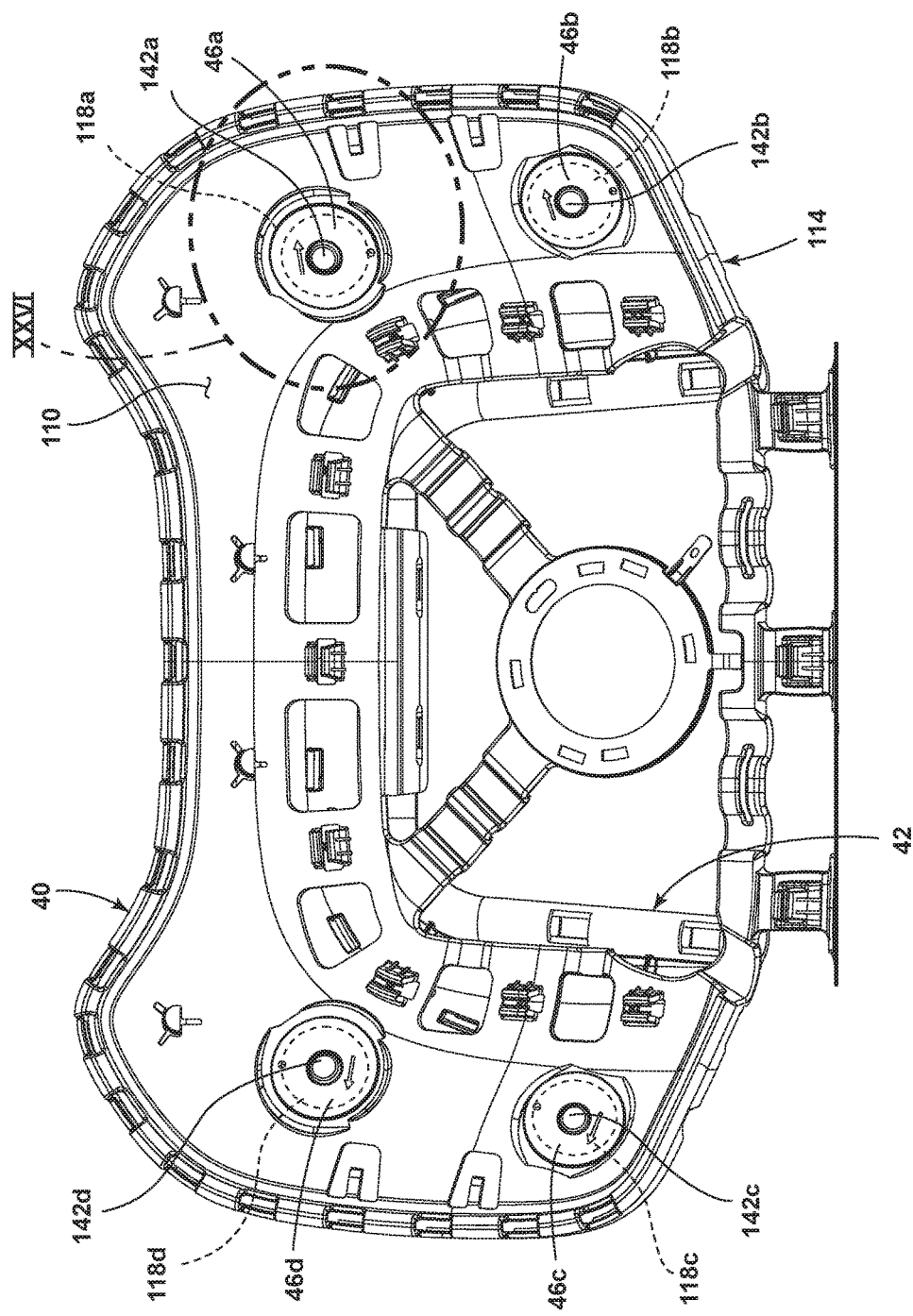
FIG. 24 is a front view of the grommets of FIG. 3 attached to the trim carrier having received the multiple snap-fit components of the closeout panel, thus interconnecting the trim closeout panel to the trim carrier.
Figure 25:
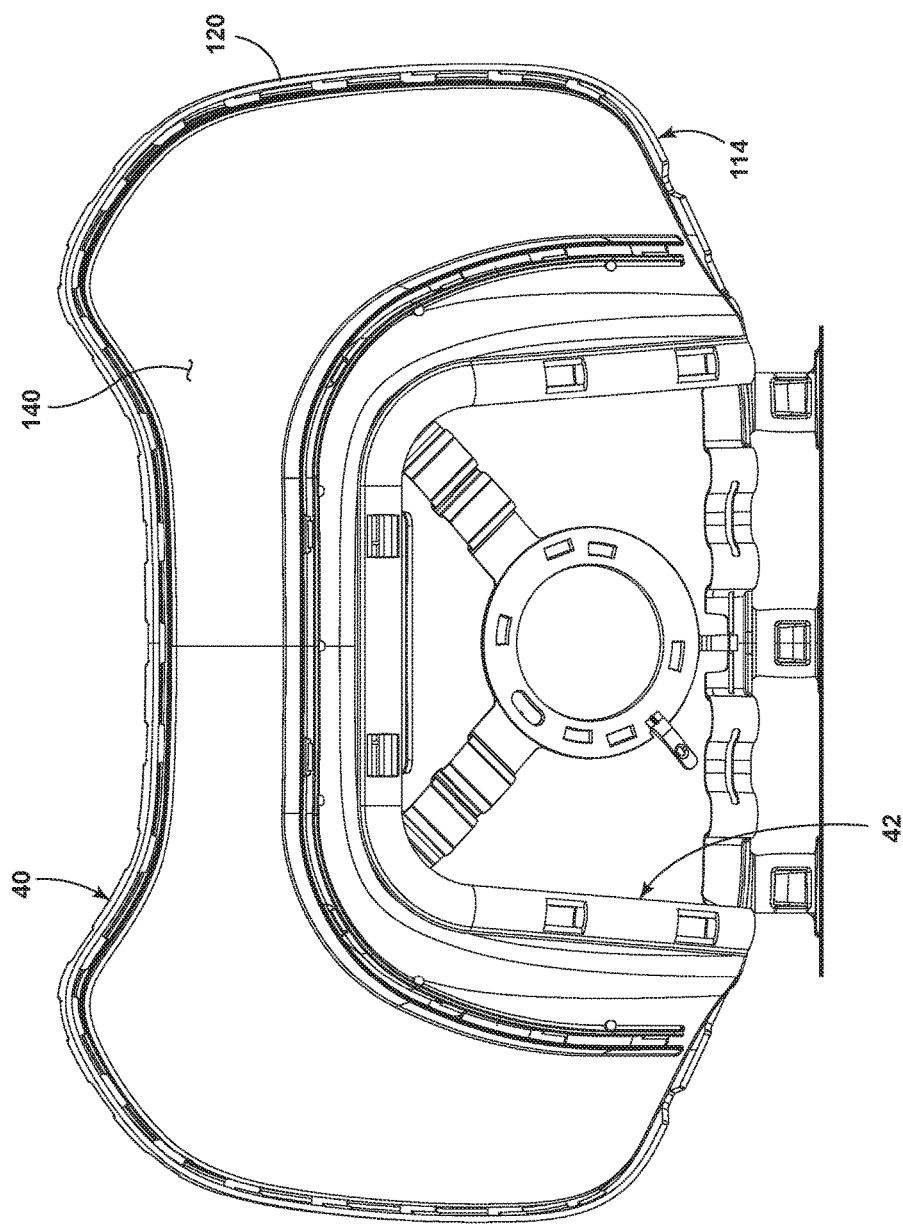
FIG. 25 is a rear view of the trim carrier of FIG. 3 interconnected with the closeout panel.
Figure 26:
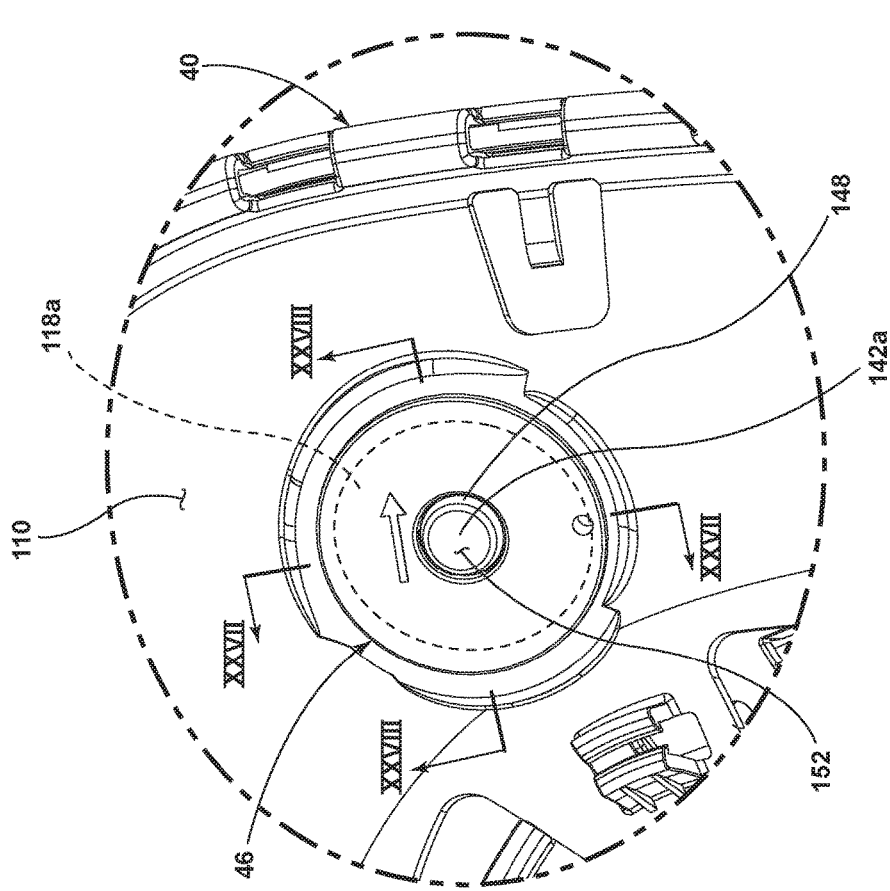
FIG. 26 is a front close-up view of area XXVI from FIG. 24, illustrating one of the grommets received in one of the grommet receivers of the trim carrier, and the grommet has received a first snap-fit component of the closeout panel in snap-fit fashion, interconnecting the closeout panel and the trim carrier.
Figure 27:
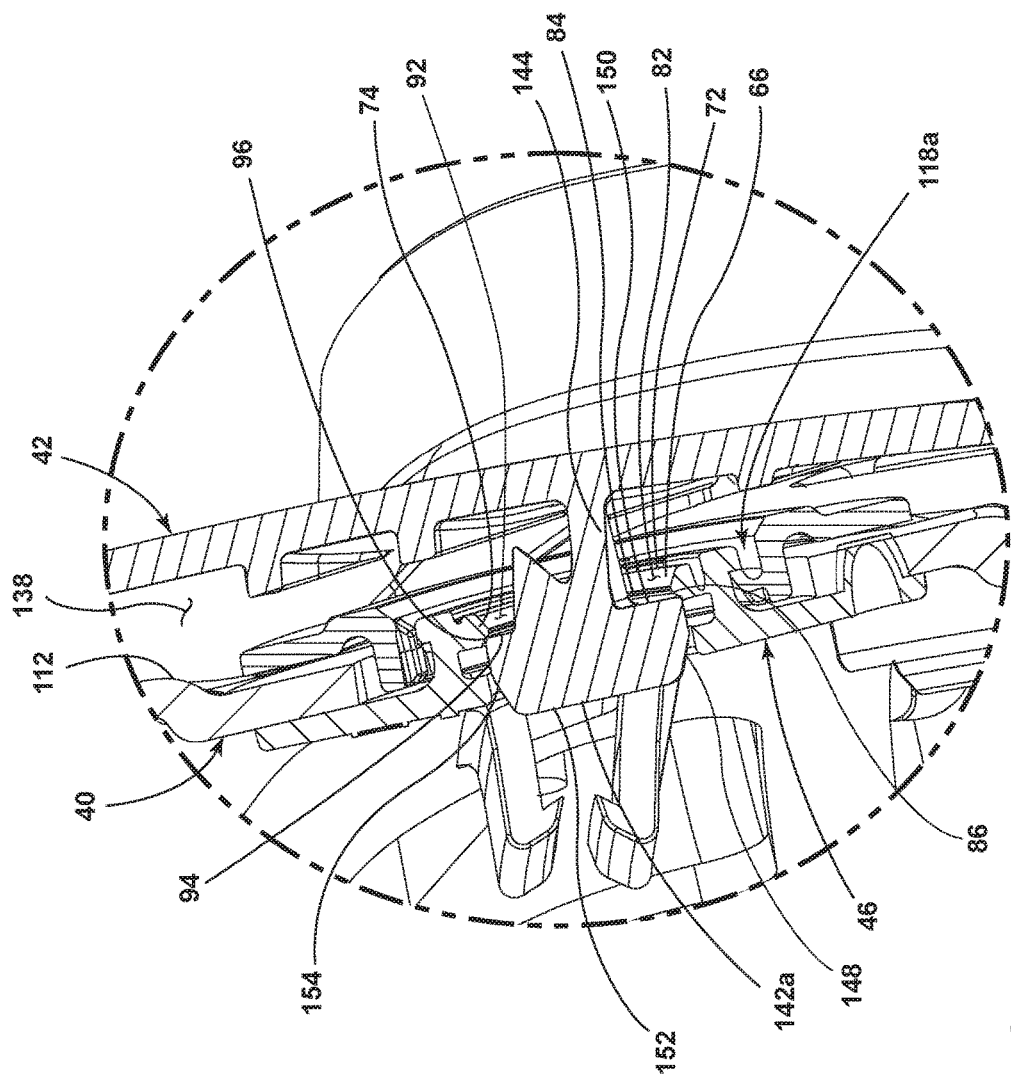
FIG. 27 is a side view of the cross-section taken along line XXVII-XXVII of FIG. 26, illustrating the second snap-fit connection component and the third snap-fit connection component only tangentially abutting the edge of the planar surface of the first snap-fit connection component, forming a relatively weak snap-fit connection.

The third snap-fit connection component 74 likewise includes a generally reward facing deformation surface 92 extending inward relative to the inside cylindrical surface 64 (see particularly FIG. 10). The deformation surface 92 ends at apex 94. The third snap-fit connection component 74 further includes a retaining surface 96. The retaining surface 96 is angled (here, at approximately 45 degrees), in the same manner as the retaining surface 86 of the second snap-fit connection component 72. Again as discussed below, a snap-fit component of the closeout panel 42 contacts the deformation surface 92 and is forced to and over the apex 94, resulting in the snap-fit component abutting the retaining surface 96 of the third snap-fit connection component 74 of the grommet 46. The retaining surface 96, facing and abutting the snap-fit component of the closeout panel 42, thereafter resists separation of the grommet 46 (and therefore of the trim carrier 40) from the closeout panel 42. The snap-fit component of the closeout panel 42 that interacts with the first snap-fit connection component 70 can be the same or different component as the snap-fit component that interacts with the third snap-fit connection component 74. The first snap-fit connection component 70, the second snap-fit connection component 72, and the third snap-fit connection component 74, including the retaining surfaces 80, 86, 96 thereof, are all disposed around the channel 66.

The grommet 46 further includes a centerline 98 dividing the channel 66 into two, approximately equal, sections—an outboard section 100 and an inboard section 102. The outboard section 100 is disposed toward the outboard direction 18 of the first seating assembly 26, when the grommet 46 is attached to the trim carrier 40, as discussed further below. The inboard section 102 is disposed toward the inboard direction 20 of the first seating assembly 26, when the grommet 46 is attached to the trim carrier 40, as discussed further below. The centerline 98 is orthogonal to, and intersects with, the axis 68 of the channel 66. The retaining surface 80 of the first snap-fit connection component 70 includes a center 104 (see particularly FIG. 4). Likewise, the retaining surfaces 86, 96 of the second snap-fit connection component 72 and the third snap-fit connection component 74, respectively, each include a center 106, 108, respectively. The center 104 of the retaining surface 80 of the first snap-fit connection component 70 extends into the outboard section 100 of the channel 66 (the section of the channel 66 disposed toward the outboard direction 18 of the first seating assembly 26). The center 106 of the retaining surface 86 of the second snap-fit connection component 72 and the center 108 of the retaining surface 96 of the third snap-fit connection component 74 extend into the inboard section 102 of the channel 66 (the other section of the channel 66 disposed toward the inboard direction 20 of the first seating assembly 26).

As discussed further below, the first snap-fit connection component 70 of the grommet 46 resists separating from the closeout panel 42 when a force attempting to separate the trim carrier 40 from the closeout panel 42 is applied to the trim carrier 40 and therefore the grommet 46 from the outboard direction 18 to a greater degree than the second snap-fit connection component 72 and the third snap-fit connection component 74 resist separating from the closeout panel 42 when a force attempting to separate the trim carrier 40 from the closeout panel 42 is applied to the trim carrier 40 and therefore the grommet 46 from the inboard direction 20.

Referring now to FIGS. 11-14, the trim carrier 40 includes a forward facing surface 110 and a rearward facing surface 112 on the opposite side of the trim carrier 40 as the forward facing surface 110. The trim carrier 40 is divided into an upper thoracic section 114 and a lower lumbar section 116, positioned in accordance with the upper thoracic section 47 and the lower lumbar section 49 of the seatback 34, respectively. In this embodiment, the trim carrier 40 includes multiple grommet receivers 118a-d arranged near a perimeter 120 of the upper thoracic section 114. The trim carrier 40 could include multiple grommet receivers disposed near a perimeter 122 of the lower lumbar section 116 as well. Each grommet receiver 118a-d can be structured the same, and thus only grommet receiver 118a will be discussed particularly. However, grommet receivers 118a and 118b disposed to one side of the midline 12 of the first seating assembly (i.e., at the one half 14 of the first seating assembly 26) are oriented oppositely (i.e., rotated 180 degrees) as grommet receivers 118c and 118d disposed to the other side of the midline 12 (i.e., at the other half 16 of the first seating assembly 26). Grommet receiver 118a (see particularly FIGS. 13 and 14) includes an aperture 124 to receive the grommet 46, which in this embodiment is essentially circular. The aperture 124 is surrounded by snap-fit lips 126a-d arranged in an arc around the aperture 124, with one or more breaks 128a-d separating the snap-fit lips 126a-d. Each snap-fit lip 126a-d can be identically structured, and thus only snap-fit lip 126d will be described particularly. Snap-fit lip 126d includes a contact surface 130. The contact surface 130 is approximately forward facing, but is angled rearward and toward the center of the aperture 124. The contact surface 130 culminates in an apex 132, which then transitions into an undercut 134. The trim carrier 40 further includes a poke-yoke boss receiver associated with grommet receivers 118a-d. For example, poke-yoke boss receiver 136 is disposed near (in this embodiment, below) grommet receiver 118a. Each of the remaining grommet receivers 118b-d likewise have an associated poke-yoke boss receiver nearby. More specifically, the poke-yoke boss receivers associated with grommet receivers 118a and 118b are disposed below grommet receivers 118a and 118b, while the poke-yoke boss receivers associated with grommet receivers 118c and 118d are disposed above grommet receivers 118c and 118d. The poke-yoke boss receiver 136 is a recess (here, a cylindrical recess) formed into the forward facing surface 110 of the trim carrier 40.

Referring now to FIGS. 15-19, the closeout panel 42 includes a forward facing surface 138 and a rearward facing surface 140 on the opposite side of the closeout panel 42 as the forward facing surface 138. As further described below, the forward facing surface 138 faces the rearward facing surface 112 of the trim carrier 40. The closeout panel 42 corresponds to the upper thoracic section 114 of the trim carrier 40 and forms a cover over the rearward facing surface 112 of the trim carrier 40.

The closeout panel 42 further includes a first snap-fit component 142a as well as other snap-fit components 142b-d extending generally forward from the forward facing surface 138. Because the other snap-fit components 142b-d are structured identically to the first snap-fit component 142a, only the first snap-fit component 142a will be described particularly. The first snap-fit component 142a (see particularly FIGS. 18 and 19) includes an extension portion 144. The extension portion 144 extends approximately orthogonally forward from the forward facing surface 138. The extension portion 144 may include strengthening ribs 146. The first snap-fit component 142a further includes a contact portion 148 extending generally orthogonally outward and forward from the extension portion 144. The contact portion 148 in this embodiment is circular. The contact portion 148 includes a planar surface 150 on the rearward side of the contact portion 148. The planar surface 150 extends outward approximately orthogonally from the extension portion 144 and is approximately parallel to the adjacent forward facing surface 138 of the closeout panel 42 from which the extension portion 144 extends. The planar surface 150 faces generally rearward and faces the forward facing surface 138 of the closeout panel 42. The contact portion 148 further includes a forward surface 152 on the other side of the contact portion 148 as the planar surface 150. The forward surface 152 in this embodiment is planar and generally parallel to the planar surface 150. The contact portion 148 further includes an angled surface 154 extending outward and rearward from the forward surface 152 to the planar surface 150.

Referring now to FIGS. 20-23, in use, the grommet 46 is interconnected with the trim carrier 40. More specifically, grommet 46 is placed in grommet receiver 118a of the trim carrier 40, and grommets 46b-d are placed in grommet receivers 118b-d, respectively, of the trim carrier 40. Because all of the grommets 46, 46b-d, are placed in their respective grommet receivers 118a-d the same way (with the exception that grommets 46c and 46d are rotated 180 degrees compared to grommets 46 and 46b), only the placement of grommet 46 into grommet receiver 118a will be particularly described. To place grommet 46 in the grommet receiver 118a, the internally facing surface 54 of the grommet 46 is placed facing the forward facing surface 110 of the trim carrier 40. The connection section 50 of the grommet 46 is placed adjacent the aperture 124 of the grommet receiver 118a of the trim carrier 40, and the poke-yoke boss 56 of the grommet 46 is placed adjacent the poke-yoke boss receiver 136 of the trim carrier 40. The grommet 46 is then forced into the grommet receiver 118a. The cylindrical lip 62 of the connection section 50 of the grommet 46 contacts the contact surface 130 of the snap-fit lips 126a-d, respectively, of the grommet receiver 118a of the trim carrier 40, deforming the snap-fit lips 126a-d until cylindrical lip 62 passes over the apex 132 of the snap-fit lips 126a-d, respectively. The snap-fit lips 126a-d then return to their pre-deformation state. The apexes 132 of the snap-fit lips 126a-d are forward of and oppose the cylindrical lip 62 of the grommet 46, and are adjacent the outside cylindrical surface 58 of the grommet 46, while the forward facing surface 110 of the trim carrier 40 faces the internally facing surface 54 of the grommet 46, thus interconnecting the grommet 46 to the trim carrier 40 in snap-fit fashion. The poke-yoke boss receiver 136 has received the poke-yoke boss 56 of the grommet 46. The contact surface 130 of each of the snap-fit lips 126*a*-*d* is adjacent the outside cylindrical surface 58 of the connection section 50 of the grommet 46. The forward facing surface 52 of the first section 48 of the grommet 46 is approximately parallel with the forward facing surface 110 of the trim carrier 40 adjacent the grommet 46. The internally facing surface 54 of the first section 48 of the grommet 46 abuts and faces a portion of the forward facing surface 110 of the trim carrier 40. Instead of incorporating the grommets 46, 46*b*-*d*, the trim carrier 40 could be molded to directly include the snap-fit features that the grommets 46, 46*b*-*d*, provide to interconnect the trim carrier 40 and the closeout panel 42, which interconnection is discussed further below.

Referring now to FIGS. 24-28, in use, the grommet 46 is additionally interconnected with the closeout panel 42. The forward facing surface 138 of the closeout panel 42 is set facing the rearward facing surface 112 of the upper thoracic section 114 of the trim carrier 40. The first snap-fit component 142*a* of the closeout panel 42 is lined up with the axis 68 of the channel 66 of the grommet 46 retained in the grommet receiver 118*a* of the trim carrier 40. The other snap-fit components 142*b*-*d* of the closeout panel 42 are likewise lined up with their respective grommets 46*b*-*d* retained in the grommet receivers 118*b*-*d* elsewhere disposed on the trim carrier 40. Because the interconnection of the first snap-fit component 142*a* of the closeout panel 42 with the grommet 46 is the same as the interconnection of the other snap-fit components 142*b*-*d* of the closeout panel 42 with the other grommets 46*b*-*d*, only the interconnection of the first snap-fit component 142*a* of the closeout panel 42 with the grommet 46 will be particularly described herein. However, it should be understood that the interconnection of the snap-fit component 142*c* with grommet 46*c* and snap-fit component 142*d* with grommet 46*d* are mirror-images (i.e., rotated 180 degrees) compared to the interconnection of the first snap-fit component 142*a* with grommet 46 and snap-fit component 142*b* with grommet 46*b*. The interconnection of the snap-fit component 142*c* and grommet 46*c*, for example, is disposed on the opposite side of the midline 12 of the first seating assembly 26 as the interconnection of the first snap-fit component 142*a* and grommet 46. Therefore, the outboard direction 16 relative to the midline 12 is in one direction for the interconnection of the snap-fit component 142*c* and grommet 46*c* and the opposite direction for the interconnection of the first snap-fit component 142*a* and grommet 46. The contact portion 148 of the first snap-fit component 142*a* is forced into the channel 66 of the connection section 50 of the grommet 46. The forward surface 152 of the first snap-fit component 142*a* enters the channel 66 first. The angled surface 154 of the contact portion 148 of the first snap-fit component 142*a* contacts the deformation surfaces 76, 82, 92 of the first snap-fit connection component 70, the second snap-fit connection component 72, and the third snap-fit connection component 74, respectively. The angled surface 154 of the contact portion 148 deforms the deformation surfaces 76, 82, 92 as the first snap-fit component 142*a* is forced further into the channel 66 until the angled surface 154 passes over the apexes 78, 84, 94 of the first snap-fit connection component 70, the second snap-fit connection component 72, and the third snap-fit connection component 74, respectively. The first snap-fit connection component 70, the second snap-fit connection component 72, and the third snap-fit connection component 74 then return to their original, non-deformed, position and shape.

The first snap-fit component 142*a* of the closeout panel 42 now extends into channel 66 of the connection section 50 of the grommet 46. The trim carrier 40, via the grommet 46 or directly if the snap-fit receiving features of the grommet 46 are molded directly into the trim carrier 40, has received the first snap-fit component 142*a* of the closeout panel 42 to form a snap-fit connection. The contact portion 148 of the first snap-fit component 142*a* of the closeout panel 42 is disposed within the channel 66 of the trim carrier 40. The closeout panel 42 and the grommet 46 are now interconnected and, because the grommet 46 is interconnected with the trim carrier 40, the trim carrier 40 is interconnected with the closeout panel 42 through a snap-fit connection. The apexes 78, 84, 94 of the first snap-fit connection component 70, the second snap-fit connection component 72, and the third snap-fit connection component 74, respectively, of the grommet 46 extend toward the extension portion 144 for the first snap-fit component 142*a* of the closeout panel 42. The retaining surface 80 of the first snap-fit connection component 70 of the grommet 46 abuts the planar surface 150 of the first snap-fit component 142*a* of the closeout panel 42 (see particularly FIG. 28). The retaining surface 86 of the second snap-fit connection component 72 of the grommet 46 abuts the planar surface 150 of the first snap-fit component 142*a* of the closeout panel 42 (see particularly FIG. 27). The retaining surface 96 of the third snap-fit connection component 74 of the grommet 46 abuts the planar surface 150 of the first snap-fit component 142*a* of closeout panel 42.

Figure 28:
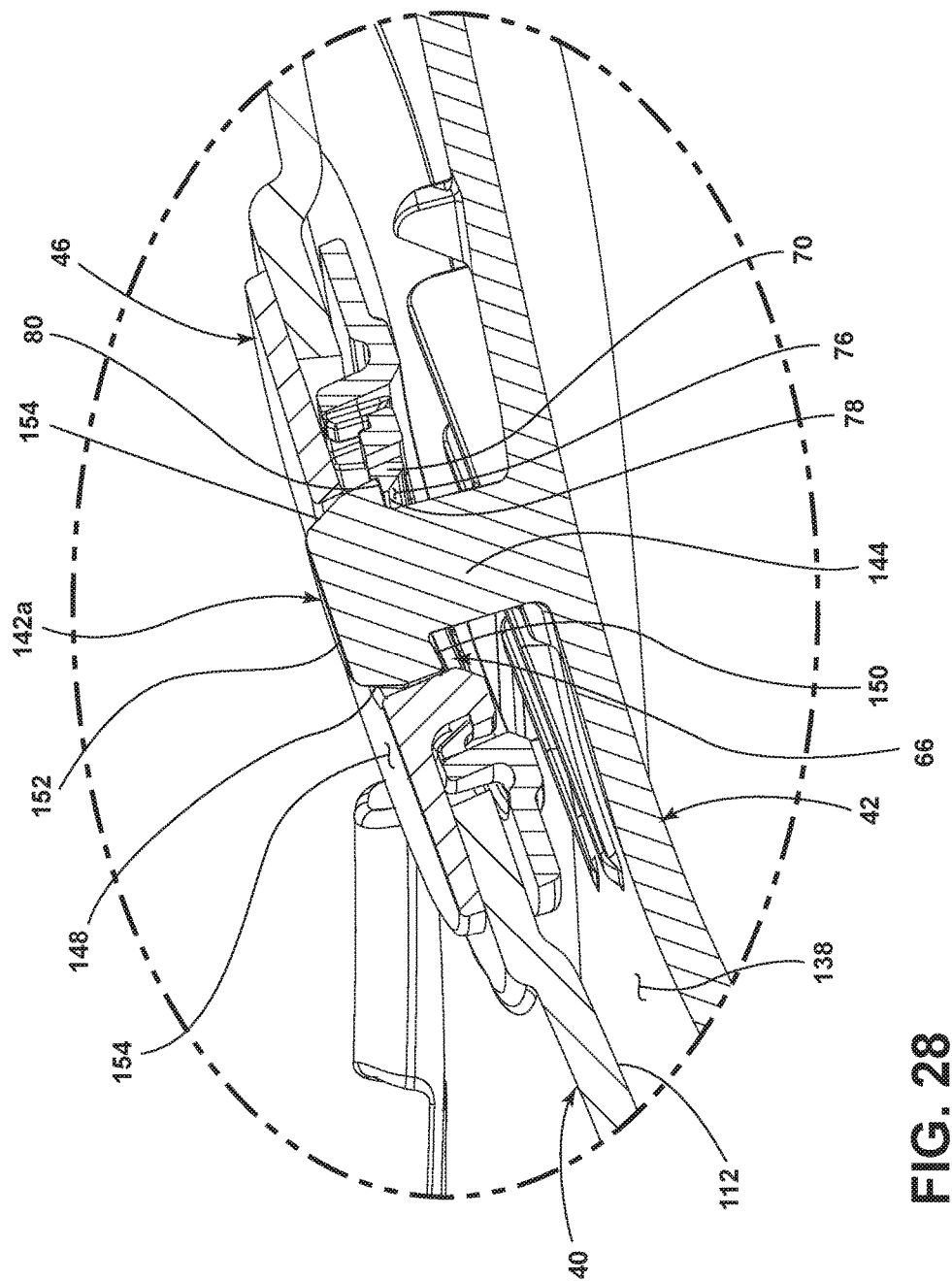
FIG. 28 is a side view of the cross-section taken along line XXVIII-XXVIII of FIG. 26, illustrating the first snap-fit connection component directly facing the planar surface of the first snap-fit connection component, forming a relatively strong snap-fit connection.

The retaining surface 80 of the first snap-fit connection component 70 is planar and approximately parallel with the opposing planar surface 150 of the first snap-fit component 142*a* of the closeout panel 42, forming a relatively strong snap-fit connection between the closeout panel 42 and the grommet 46 and thus between the closeout panel 42 and the trim carrier 40 (see FIG. 28). In contrast, the retaining surfaces 86, 96 of the second snap-fit connection component 72 and the third snap-fit connection component 74, respectively, are angled, as explained above, and thus only tangentially abut the edge of the planar surface 150 of the first snap-fit connection component 70, forming a relatively weak snap-fit connection (see FIG. 27). The planar retaining surface 80 of the first snap-fit connection component 70 opposing the planar surface 150 of the first snap-fit component 142*a* of the closeout panel 42 causes the snap-fit connection between trim carrier 40 and the closeout panel 42 to resist disconnection of the trim carrier 40 from the closeout panel 42 when a force (such as a separating force in the forward direction) is applied to the trim carrier 40 from the outboard direction 18 (i.e., at the outboard side) of the snap-fit connection to a greater degree than when a force is applied to the trim carrier 40 from the inboard direction 20 (i.e., at the inboard side) of the snap-fit connection. The planar retaining surface 80 of the first snap-fit connection component 70 opposes the planar surface 150 of the first snap-fit component 142*a* of the closeout panel 42 at the outboard side of the snap-fit connection. The angled retaining surfaces 86, 96 of the second snap-fit connection component 72 and the third snap-fit connection component 74, respectively, only tangentially abut the edge of the planar surface 150 of the first snap-fit component 142*a* of the closeout panel 42 and do so toward the inboard direction 20 (i.e., at the inboard side) of the snap-fit connection, providing less resistance to a force attempting to disconnect the trim carrier 40 from the closeout panel 42. When a passenger enters the interior 22 of the vehicle 10 and attempts to sit in the first seating assembly 26, the passenger may pull forward on the outboard edge 156 (see FIG. 2) of the upper thoracic section 47 of the seatback 34. The relatively strong snap-fit connection provided by the planar retaining surface 80 of the first snap-fit connection component 70 and the planar surface 150 of the first snap-fit component 142*a* of the closeout panel 42 resists separation of the trim carrier 40 and the closeout panel 42 when the passenger's pulling force is applied. However, a service technician can still separate the trim carrier 40 and the closeout panel 42 by applying a force from the inboard direction 20 (i.e., at the inboard side) of the grommet 46, because the snap-fit connection provided by the second snap-fit connection component 72 and the third snap-fit connection component 74 is relatively weaker.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a first seating assembly including a seat, a seatback, and a midline defining an outboard direction directed away from the midline, and an inboard direction directed toward the midline; and
      the seatback comprising a trim carrier interconnected with a closeout panel through a snap-fit connection;
   wherein, the snap-fit connection resists disconnection of the trim carrier from the closeout panel when a force is applied to the trim carrier from the outboard direction of the snap-fit connection to a greater degree than when a force is applied to the trim carrier from the inboard direction of the snap-fit connection.

2. The vehicle of claim 1,
   the closeout panel including a forward facing surface, a rearward facing surface on the opposite side of the closeout panel as the forward facing surface, and a first snap-fit component extending from the forward facing surface;
   wherein, the trim carrier receives the first snap-fit component to form the snap-fit connection.

3. The vehicle of claim 2,
   the first snap-fit component of the closeout panel including a planar surface that faces generally rearward; and
   the trim carrier including a first snap-fit connection component that includes a planar retaining surface and a second snap-fit connection component that includes an angled retaining surface;
   wherein, the snap-fit connection includes the planar retaining surface of the first snap-fit connection component abutting the planar surface of the first snap-fit component of the closeout panel; and
   wherein, the snap-fit connection further includes the angled retaining surface of the second snap-fit connection component abutting the planar surface of the first snap-fit component of the closeout panel.

4. The vehicle of claim 3,
   the trim carrier further including a channel;
   the planar retaining surface of the first snap-fit connection component and angled retaining surface of the second snap-fit connection component are disposed around the channel;
   the first snap-fit component of the closeout panel including an extension portion extending from the forward facing surface and a contact portion extending from the extension portion;
   wherein, the planar surface of the first snap-fit component is the rearward side of the contact portion; and
   wherein, the contact portion of the first snap-fit component of the closeout panel is disposed within the channel of the trim carrier.

5. The vehicle of claim 4,
   wherein, the first snap-fit connection component and the second snap-fit connection component of the trim carrier extend within the channel toward the extension portion of the first snap-fit component of the closeout panel.

6. The vehicle of claim 4,
   a centerline dividing the channel of the trim carrier into two sections, one section disposed toward the outboard direction and the other section disposed toward the inboard direction;
   wherein, the planar retaining surface of the first snap-fit connection component and the angled retaining surface of the second snap-fit connection component each include a center;
   wherein, the center of the retaining surface of the first snap-fit connection component extends into the section of the channel disposed toward the outboard direction; and
   wherein, the retaining surface of the second snap-fit connection component extends into the other section of the channel disposed toward the inboard direction.

7. The vehicle of claim 1 further comprising:
   a grommet attached to the trim carrier that provides the snap-fit connection between the trim carrier and the closeout panel.

8. A seating assembly for a vehicle comprising:
   a trim carrier including a forward facing surface and a rearward facing surface on the opposite side of the trim carrier as the forward facing surface;
   a closeout panel including a forward facing surface facing the rearward facing surface of the trim carrier and a first snap-fit component extending from the forward facing surface that includes a planar surface; and
   a grommet interconnected with the trim carrier and the closeout panel;
   wherein, grommet resists separating from the closeout panel when a force is applied to the grommet from a first direction to a greater degree than the grommet resists separating from the closeout panel when a force is applied to the grommet from a second direction, opposite the first direction.

9. The seating assembly of claim 8,
   the grommet further comprising:
      a connection section, including a first snap-fit connection component and a second snap-fit connection component, the first snap-fit connection component including a retaining surface; and
      a first section extending orthogonally from the connection section, the first section having a generally planar forward facing surface;
   wherein, the planar surface of the first snap-fit component of the closeout panel faces generally rearward; and
   wherein, the retaining surface of the first snap-fit connection component of the grommet faces generally forward.

10. The seating assembly of claim 9,
wherein, the connection section of the grommet includes an outside cylindrical surface, an inside cylindrical surface to the inside of the outside cylindrical surface, and a channel to the interior of the inside cylindrical surface; and
wherein, the first snap-fit component of the closeout panel extends into the channel of the connection section of the grommet.

11. The seating assembly of claim 10,
the first snap-fit component of the closeout panel including an extension portion extending from the forward facing surface and a contact portion extending from the extension portion;
wherein, the planar surface of the first snap-fit component is a rearward side of the contact portion.

12. The seating assembly of claim 11,
wherein, the first snap-fit connection component and the second snap-fit connection component of the grommet extend inward relative to the inside cylindrical surface of the connection section and toward the extension portion of the first snap-fit component of the closeout panel.

13. The seating assembly of claim 10,
the grommet further comprising:
a centerline dividing the channel into two sections;
a third snap-fit connection component disposed at the connection section, the third snap-fit connection component including a retaining surface that abuts the planar surface of the first snap-fit component of the closeout panel and extends inward relative to the inside cylindrical surface of the connection section and toward the extension portion of the first snap-fit component of the closeout panel;
wherein, the retaining surface of the first snap-fit connection component, the retaining surface of the second snap-fit connection component, and the retaining surface of the third snap-fit connection component each include a center;
wherein, the center of the retaining surface of the first snap-fit connection component extends into one section of the channel; and
wherein, the center of the retaining surface of the second snap-fit connection component and the center of the retaining surface of the third snap-fit connection component extend into the other section of the channel.

14. The seating assembly of claim 8,
the grommet further including a poke-yoke boss;
the trim carrier further includes a poke-yoke boss receiver; and
the poke-yoke boss receiver has received the poke-yoke boss of the grommet.

15. A grommet to interconnect a trim carrier and a closeout panel in a seating assembly in a vehicle comprising:
a first snap-fit connection component including a retaining surface configured to face and abut a planar surface of a snap-fit component of the closeout panel; and
a second snap-fit connection component including a retaining surface configured to abut a surface of the snap-fit component or another snap-fit component of the closeout panel;
wherein, the first snap-fit connection component resists separating from the closeout panel when a force is applied to the grommet from a first direction to a greater degree than the second snap-fit connection component resists separating from the closeout panel when a force is applied to the grommet from a second direction, opposite the first direction.

16. The grommet of claim 15 further comprising:
a connection section, including the first snap-fit connection component and the second snap-fit connection component; and
a first section extending orthogonally from the connection section, the first section having a planar forward facing surface.

17. The grommet of claim 16,
wherein, the connection section includes an outside cylindrical surface, an inside cylindrical surface to the inside of the outside cylindrical surface, and a channel to the interior of the inside cylindrical surface;
wherein, the first section extends orthogonally outward from the inside cylindrical surface of the connection section; and
wherein, the first snap-fit connection component and the second snap-fit connection component extend inward relative to the inside cylindrical surface of the connection section.

18. The grommet of claim 16,
wherein, the retaining surface of the first snap-fit connection component is parallel with, and faces the same direction as, the planar forward facing surface of the first section.

19. The grommet of claim 17 further comprising:
a centerline dividing the channel into two sections;
a third snap-fit connection component disposed at the connection section, the third snap-fit connection component including a retaining surface configured to abut a surface of the snap-fit component or another snap-fit component of the closeout panel;
wherein, the third snap-fit connection component extends inward relative to the inside cylindrical surface of the connection section;
wherein, the retaining surface of the first snap-fit connection component, the retaining surface of the second snap-fit connection component, and the retaining surface of the third snap-fit connection component each include a center; and
wherein, the center of the retaining surface of the first snap-fit connection component extends into one section of the channel; and
wherein, the center of the retaining surface of the second snap-fit connection component and the center of the retaining surface of the third snap-fit connection component extend into the other section of the channel.

20. The grommet of claim 16,
wherein, the first section further includes an internally facing surface on the other side of the first section as the planar forward facing surface and a poke-yoke boss extending from the internally facing surface;
wherein, the connection section includes a cylindrical lip; and
wherein, the poke-yoke boss and the cylindrical lip of the connection section are configured to be received by trim carrier.

* * * * *